United States Patent
Nakagawa

(10) Patent No.: US 8,411,215 B2
(45) Date of Patent: Apr. 2, 2013

(54) ACTIVE MATRIX SUBSTRATE, LIQUID CRYSTAL PANEL, LIQUID CRYSTAL DISPLAY UNIT, LIQUID CRYSTAL DISPLAY DEVICE, TELEVISION RECEIVER, AND METHOD FOR PRODUCING ACTIVE MATRIX SUBSTRATE

(75) Inventor: Hidetoshi Nakagawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 543 days.

(21) Appl. No.: 12/601,698

(22) PCT Filed: May 12, 2008

(86) PCT No.: PCT/JP2008/058741
§ 371 (c)(1), (2), (4) Date: Nov. 24, 2009

(87) PCT Pub. No.: WO2009/037892
PCT Pub. Date: Mar. 26, 2009

(65) Prior Publication Data
US 2010/0165225 A1    Jul. 1, 2010

(30) Foreign Application Priority Data

Sep. 20, 2007 (JP) .................................. 2007-244227

(51) Int. Cl.
    *G02F 1/1343*    (2006.01)
    *G02F 1/1333*    (2006.01)
    *G02F 1/13*    (2006.01)

(52) U.S. Cl. ................. 349/39; 349/38; 349/54; 349/55; 349/192

(58) Field of Classification Search ..................... 349/38, 349/39, 54–55, 192
See application file for complete search history.

(56) References Cited

U.S. PATENT DOCUMENTS

| | | | | | |
|---|---|---|---|---|---|
| 5,977,563 | A | * | 11/1999 | Kubo et al. | 257/72 |
| 2002/0012077 | A1 | * | 1/2002 | Fukami et al. | 349/38 |
| 2002/0140894 | A1 | * | 10/2002 | Morimoto | 349/156 |
| 2008/0002076 | A1 | | 1/2008 | Yagi et al. | |
| 2008/0143914 | A1 | | 6/2008 | Nakagawa et al. | |
| 2008/0143937 | A1 | | 6/2008 | Nakagawa et al. | |
| 2008/0192165 | A1 | | 8/2008 | Nakagawa et al. | |
| 2009/0015745 | A1 | | 1/2009 | Nakagawa et al. | |
| 2009/0225247 | A1 | | 9/2009 | Yagi et al. | |

FOREIGN PATENT DOCUMENTS

| | | |
|---|---|---|
| JP | 2000-284320 | 10/2000 |
| JP | 2000-347217 | 12/2000 |
| JP | 2004-198718 | 7/2004 |
| JP | 2004-347891 | 12/2004 |
| JP | 2005-114932 | 4/2005 |
| JP | 2007-003709 | 1/2007 |
| JP | 2007-052286 | 3/2007 |

OTHER PUBLICATIONS

International Search Report for PCT/JP2008/058741, mailed Jun. 17, 2008.

* cited by examiner

*Primary Examiner* — Jessica M Merlin
(74) *Attorney, Agent, or Firm* — Nixon & Vanderhye P.C.

(57) ABSTRACT

Retention capacitor upper electrodes and wires are provided facing a retention capacitor line across an insulating film so as to form a retention capacitor. The retention capacitor line includes a slit penetrating the retention capacitor line in a direction perpendicular to a substrate. The slit is formed so as to overlap regions facing regions in which both wires are formed. This allows for provision of an active matrix substrate capable of repairing defects so that they are less visible, without decreasing an aperture ratio of each pixel.

12 Claims, 16 Drawing Sheets

ACTIVE MATRIX SUBSTRATE, LIQUID CRYSTAL PANEL, LIQUID CRYSTAL DISPLAY UNIT, LIQUID CRYSTAL DISPLAY DEVICE, TELEVISION RECEIVER, AND METHOD FOR PRODUCING ACTIVE MATRIX SUBSTRATE

This application is the U.S. national phase of International Application No. PCT/JP2008/058741 filed 12 May 2008, which designated the U.S. and claims priority to JP Application No. 2007-244227 filed 20 Sep. 2007; the entire contents of each of which are hereby incorporated by reference.

TECHNICAL FIELD

The present invention relates to: an active matrix substrate including on a substrate transistor elements, pixel electrodes, scanning signal lines, data signal lines, and retention capacitor lines; a liquid crystal panel; a liquid crystal display unit; a liquid crystal display device; a television receiver; and a method for producing active matrix substrates.

BACKGROUND ART

Liquid crystal display devices are flat display devices having excellent characteristics such as high resolution, thinness, light weight, and low power consumption. In recent years, a market for liquid crystal display devices has been rapidly expanding in scale due to improvement in display performance, production capacity, and competitiveness in price with other display devices.

A known method for driving liquid crystal display devices is an active matrix driving method. A liquid crystal display device driven by the active matrix driving method includes an active matrix substrate 100 as illustrated in FIG. 17. The active matrix substrate 100 includes: a plurality of scanning signal lines 116; a plurality of data signal lines 115 provided so as to cross the scanning signal lines; thin film transistors (TFTs) 112 formed adjacent to intersections of the signal lines (115, 116); and pixel electrodes 117. Each of the TFTs 112 includes: a source electrode 119 connected to one of the data signal lines 115; and a drain electrode 108 connected via a wire 107 to one of the pixel electrodes 117. Each of the scanning signal lines 116 also serves as a gate electrode of one of the TFTs 112.

The wire 107 and the pixel electrode 117 are separated by an insulating film, which has a hole. This provides a contact hole 110 for connecting the wire 107 with the pixel electrode 117. Each pixel electrode 117 is a transparent electrode made of, e.g., ITO, and transmits light (backlight) from below the active matrix substrate.

In the active matrix substrate 100, each TFT 112 is switched on (i.e., is set in a state allowing for conduction between its source electrode 119 and drain electrode 108) by a scanning signal (gate ON voltage) transmitted through a corresponding scanning signal line 116. In this state, a data signal (signal voltage) transmitted through a corresponding data signal line 115 is written, via the source electrode 119, the drain electrode 108, and a corresponding wire 107, into a corresponding pixel electrode 117. Retention capacitor (Cs) lines 118 each have a function of, e.g., preventing self-discharge of a liquid crystal layer, the self-discharge being caused while a TFT 112 is off.

In a process of producing the active matrix substrate 100, foreign objects, film residues and/or the like may cause a short circuit (leak) between the source electrode 119 and the drain electrode 108 of any TFT 112. Such a defective TFT fails to apply a normal voltage (drain voltage) to its corresponding pixel electrode 117.

A liquid crystal display device of a vertical alignment (VA) mode, for example, generally carries out a normally black display, in which it carries out a black display when no voltage is applied, while it carries out a white display when a voltage is applied. In such a liquid crystal display device, a source-drain short circuit as described above causes a voltage to be constantly applied to the pixel. This results in a pixel defect of a bright dot, which is a highly visible defect.

Such a pixel defect may be repaired by the following method of a repairing process: When a TFT 112 has a short circuit between its source electrode 119 and drain electrode 108 as indicated by X1 in FIG. 17, its corresponding wire 107 is cut, e.g., at a position indicated by X2. This electrically separates a corresponding pixel electrode 117 from the TFT 112. Further, a retention capacitor line 118 and the wire 107 are melted at a position indicated by X3 so as to be short-circuited with each other. This electrically connects the pixel electrode 117 with the retention capacitor line 118.

In consequence of the above repairing process, a voltage having a potential of a voltage of the retention capacitor line 118 is applied to the pixel electrode 117 of the defective pixel. This causes the pixel to be shown as a black dot in a case of a display method of a normally black mode, thus rendering the defective pixel less visible than when it is shown as a bright dot.

CITATION LIST

Patent Literature 1

Japanese Patent Application Publication, Tokukai, No. 2000-347217 A (Publication Date: Dec. 15, 2000)

Patent Literature 2

Japanese Patent Application Publication, Tokukai, No. 2004-347891 A (Publication Date: Dec. 9, 2004)

Patent Literature 3

Japanese Patent Application Publication, Tokukai, No. 2000-284320 A (Publication Date: Oct. 13, 2000)

Patent Literature 4

International Publication WO 2006/064832 A1 (Publication Date: Jun. 22, 2006)

SUMMARY OF INVENTION

The above conventional repairing process causes a defective pixel to be shown as a dark dot so that the defective pixel is less visible than when it is shown as a bright dot. However, since display screens of recent years are larger than before, pixels are also larger accordingly. Thus, even a defective pixel shown as a dark dot is visible. In other words, the above repair method is less sufficiently effective for defect repair.

The present invention has been accomplished in view of the above problem. It is an object of the present invention to provide (i) an active matrix substrate, a liquid crystal panel, a liquid crystal display unit, a liquid crystal display device, and a television receiver, each of which is capable of repairing defects so that they are less visible, without reducing an aperture ratio of each pixel, and (ii) a method for producing the active matrix substrate.

In order to attain the above object, an active matrix substrate of the present invention includes a substrate on which a transistor element, a pixel electrode, a scanning signal line, a data signal line, and a retention capacitor line are provided, the active matrix substrate further including: at least two retention capacitor electrodes each facing the retention capacitor line via an insulating film so as to form a retention capacitance; and connection lines via which the at least two retention capacitor electrodes are connected with the pixel electrode, the retention capacitor line having at least one opening which penetrates the retention capacitor line in a direction perpendicular to a surface of the substrate, the at least two retention capacitor electrodes being provided for the retention capacitor line, the at least one opening being formed so as to include first regions facing respective second regions in which the at least two retention capacitor electrodes are provided.

First, the above arrangement includes the opening formed in the retention capacitor line. The opening is formed so as to overlap the regions facing the regions in which at least two retention capacitor electrodes are provided. This arrangement allows the following repairing process to be carried out: First, a region of the retention capacitor line is cut off, the region being defined either by the opening and a side surface of the retention capacitor line with respect to its extending direction, or, if a plurality of the opening are provided, by the plurality of the opening. This electrically separates the region from the rest of the retention capacitor line, thus forming a separated region. Also, the separated region is short-circuited with each of the at least two of the retention capacitor electrodes at a portion lying directly above the separated region. This repairing process causes the retention capacitor electrodes, which have been thus short-circuited, to be electrically connected with each other via the separated region.

In other words, the use of the opening facilitates forming the separated region by separating a portion of the retention capacitor line from the rest of it. This allows the separated region to be used as a line for a repair. Thus, when, for example, a defect has occurred in which a voltage is not normally applied to a pixel electrode connected with a retention capacitor electrode, the defect can be repaired by electrically connecting this pixel electrode with its adjacent pixel electrode, instead of electrically connecting the defective pixel electrode with the retention capacitor line. This allows a potential substantially equivalent to a potential of the properly functioning adjacent pixel to be applied to the defective pixel. Thus, it is possible to repair defects so that they are less visible.

Further, the line allowing for the above repair can be readily formed by electrically separating a portion of the retention capacitor line. This eliminates the need, e.g., to provide in advance a redundant line on the substrate. Therefore, it is possible to provide an active matrix substrate capable of carrying out the above effective repair without reducing an aperture ratio of each pixel.

In addition to the above arrangement, the active matrix substrate of the present invention may be arranged such that the at least one opening has a shape of a linear slit when it is viewed in a direction perpendicular to the substrate, and a longitudinal direction in which the at least one opening extends is parallel to a direction in which the retention capacitor line extends.

According to the above arrangement, the opening has a shape of a linear slit, the slit having its longitudinal direction parallel to a direction in which the retention capacitor line extends. This allows for keeping small an increase in a resistance of the retention capacitor line, the increase being caused by the provision of the opening. Thus, even in a case of a large-screen liquid crystal display device which requires long retention capacitor lines and many pixels, it is possible to prevent occurrence of such problems as an increase in the resistance of the retention capacitor lines due to the provision of the opening, and a signal delay arising from the above increase.

In addition to the above arrangement, the active matrix substrate of the present invention may be arranged such that the at least one opening is formed so as to include the first regions, the number of the at least one opening being one (1).

According to the above arrangement, a single opening is formed so as to overlap the regions facing the regions in which at least two of the retention capacitor electrodes are provided. This minimizes the number of openings to be formed. Thus, it is possible to prevent to a minimum occurrence of such problems as an increase in the resistance of the retention capacitor lines due to the provision of the opening, and a signal delay arising from the above increase.

In addition to the above arrangement, the active matrix substrate of the present invention may be arranged such that the at least one opening is formed closer to a first side surface of the retention capacitor line than to a second side surface of the retention capacitor line, the first and second side surfaces being perpendicular to the direction in which the retention capacitor line is provided; and each of the at least two retention capacitor electrodes is formed, in a position where a corresponding one of the respective second regions is included, so that a region which extends from the corresponding one of the respective second regions to the first side surface is larger in area than a region which extends from the corresponding one of the respective second regions to the second side surface.

According to the above arrangement, the opening is formed closer to the first side surface. Thus, cutting the retention capacitor line so as to join the opening to the first side surface during the repairing process allows for further shortening of a length of the cutting necessary to form the cutout region.

Further, for each retention capacitor electrode, the region defined by (i) the region facing the region in which the opening is formed and (ii) the first side surface has an area exceeded by an area of the region defined by (i) the region facing the region in which the opening is formed and (ii) the second side surface. This causes a region of the retention capacitor electrode, the region facing the cutout region, to have an area, after the repairing process, exceeded by an area of a region of the retention capacitor electrode, the region facing the retention capacitor line. This allows for further reducing a change in a retention capacitance due to the repairing process. This in turn further reduces influence of other signal lines after the repairing process.

In addition to the above arrangement, the active matrix substrate of the present invention may be arranged such that the at least one opening is formed so as to include the first regions, the number of the at least one opening being two (2).

According to the above arrangement, each two openings are formed in the regions facing the regions in which at least two of the retention capacitor electrodes are provided. This allows for forming the cutout region by cutting, during the repairing process, the retention capacitor line so that the two openings are joined to each other.

In addition to the above arrangement, the active matrix substrate of the present invention may further include an auxiliary electrode provided, in a position which includes the second regions, (i) so as to face the retention capacitor line via an insulating film and (ii) so as to be electrically connected with the retention capacitor line.

According to the above arrangement, an auxiliary electrode is provided at such a position as to overlap the region facing the region in which the opening is formed, so as to face the retention capacitor line across an insulating film. The auxiliary electrode is electrically connected with the retention capacitor line. Thus, the auxiliary electrode causes no effect in a normal state. However, the auxiliary electrode being electrically connected with the retention capacitor line by a region other than the cutout region formed during the repairing process allows a retention capacitance to be formed between the cutout region and the auxiliary electrode after the repairing process. This allows for further reducing a change in the retention capacitance due to the repairing process. This in turn further reduces influence of other signal lines after the repairing process.

In addition to the above arrangement, the active matrix substrate of the present invention may be arranged such that a pixel includes a plurality of pixel electrodes.

According to the above arrangement, even when a defect has occurred in which a voltage is not normally applied to a given pixel electrode, another pixel forming the pixel including the given pixel electrode carries out a normal display. This reduces influence of the above defect on a display state.

In addition to the above arrangement, the active matrix substrate of the present invention may be arranged such that the at least two retention capacitor electrodes, that are provided in a region which faces the at least one opening, are connected with respective pixel electrodes which constitute an identical pixel.

According to the above arrangement, retention capacitor electrodes which are electrically connected with each other via the cutout region as a result of the repairing process are connected with their respective pixel electrodes constituting a single pixel. This significantly reduces influence of the repairing process on a display state of each pixel.

In addition to the above arrangement, the active matrix substrate of the present invention may be arranged such that the at least two retention capacitor electrodes, that are provided in a region which faces the at least one opening, are connected with respective pixel electrodes which constitute pixels adjacent to each other.

According to the above arrangement, the repairing process causes the cutout region to electrically connect retention capacitor electrodes with each other which are individually connected with their respective pixel electrodes forming pixels adjacent to each other. Pixels adjacent to each other normally have values of image data to be displayed, the values not largely differing from each other. Thus, it is possible to repair pixel defects to the extent that the defects can hardly be viewed as such.

A liquid crystal panel of the present invention includes the active matrix substrate.

A liquid crystal display unit of the present invention includes the liquid crystal panel and a driver.

A liquid crystal display device of the present invention includes the liquid crystal display unit and an illumination device.

A television receiver of the present invention includes the liquid crystal display device and a tuner section for receiving television broadcast.

In order to attain the above object, a method of the present invention for producing an active matrix substrate, the active matrix substrate including a substrate on which a transistor element, a pixel electrode, a scanning signal line, a data signal line, and a retention capacitor line are provided, the active matrix substrate further including: at least two retention capacitor electrodes each facing the retention capacitor line via an insulating film so as to form a retention capacitance; and connection lines via which the at least two retention capacitor electrodes are connected with the pixel electrode, the retention capacitor line having at least one opening which penetrates the retention capacitor line in a direction perpendicular to a surface of the substrate, the at least two retention capacitor electrodes being provided for the retention capacitor line, the at least one opening being formed so as to include first regions facing respective second regions in which the at least two retention capacitor electrodes are provided, the method comprising the steps of: cutting off a region of the retention capacitor line, the region being defined either by (i) the at least one opening and (ii) a side surface of the retention capacitor line with respect to its extending direction or by a plurality of the at least one opening, so as to electrically separate the region from a rest of the retention capacitor line, whereby a separated region is formed; and short-circuiting the separated region with each of the at least two of the retention capacitor electrodes at a portion lying directly above the separated region.

The above method causes the retention capacitor electrodes, which have been short-circuited as above, to be electrically connected with each other via, the separated region. Thus, when, for example, a defect has occurred in which a voltage is not normally applied to a pixel electrode connected with a retention capacitor electrode, the defect can be repaired by electrically connecting this pixel electrode with its adjacent pixel electrode, instead of electrically connecting the defective pixel electrode with the retention capacitor line. This allows a potential substantially equivalent to a potential of the properly functioning adjacent pixel to be applied to the defective pixel. Thus, it is possible to repair defects so that they are less visible.

In addition to the above steps, the method of the present invention for producing an active matrix substrate may further include the step of: cutting a connection line which electrically connects the pixel electrode with the transistor element, when the pixel electrode has a defect which causes no voltage to be normally applied to the pixel electrode.

The above method causes a defective pixel electrode to be electrically disconnected from a transistor element connected with the pixel electrode. When a defect in a transistor element prevents a voltage from being normally applied to its corresponding pixel electrode, the above method prevents an unnecessary voltage from being applied from the transistor element to the pixel electrode.

(a) is a plan view illustrating an example state of a retention capacitor line and a wire before a repairing process, and (b) is a plan view illustrating an example state of the retention capacitor line and the wire after the repairing process.

FIG. 9

(a) is a plan view illustrating another example state of a retention capacitor line and a wire before a repairing process, and (b) is a plan view illustrating another example state of the retention capacitor line and the wire after the repairing process.

FIG. 10

(a) is a plan view illustrating still another example state of a retention capacitor line and a wire before a repairing process, and (b) is a plan view illustrating still another example state of the retention capacitor line and the wire after the repairing process.

FIG. 11

(a) is a plan view illustrating an arrangement of an auxiliary electrode and its vicinity, and (b) is a cross-sectional view illustrating an arrangement of the auxiliary electrode and its vicinity.

FIG. 12

(a) is a plan view illustrating still another example state of a retention capacitor line and a wire before a repairing process, and (b) is a plan view illustrating still another example state of the retention capacitor line and the wire after the repairing process.

FIG. 13

(a) is a plan view illustrating still another example state of a retention capacitor line and a wire before a repairing process; (b) is a plan view illustrating still another example state of the retention capacitor line and the wire after the repairing process; and (c) is a plan view illustrating still another example state of the retention capacitor line and the wire after another repairing process.

Figure 14:
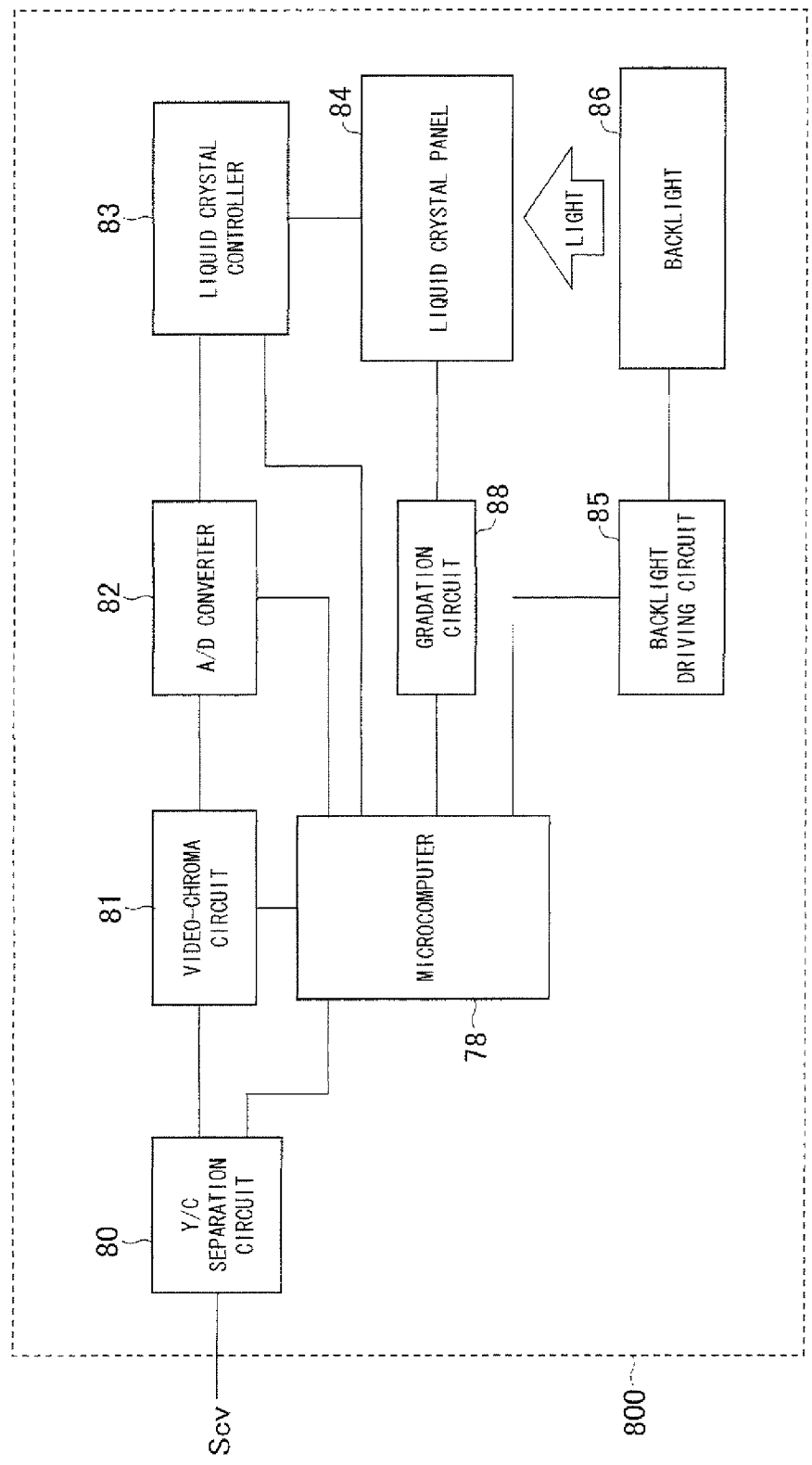

FIG. 14 is a block diagram illustrating an arrangement of a display device for use in a television receiver.

Figure 15:
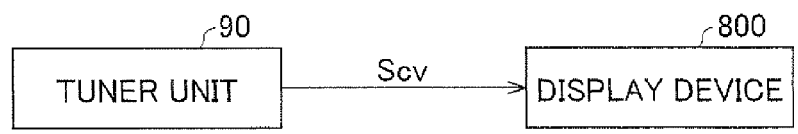

FIG. 15 is a block diagram illustrating a relation of connection between a tuner section and the display device.

Figure 16:
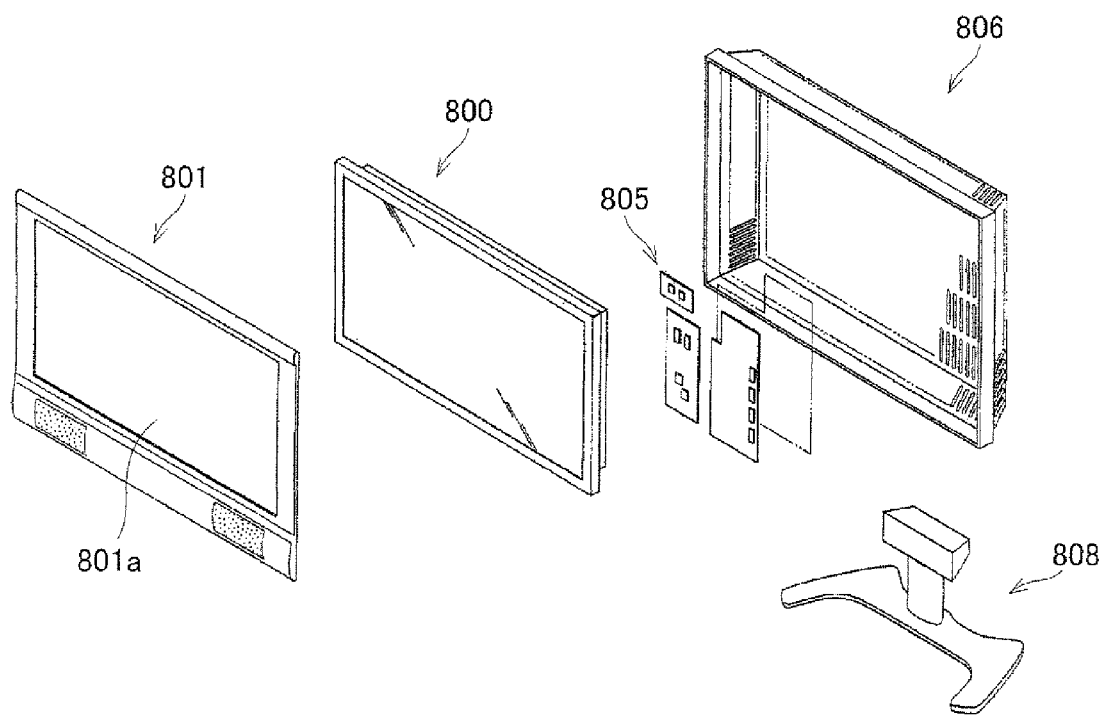

FIG. 16 is an exploded perspective view illustrating an example mechanical arrangement of the display device used in a television receiver.

Figure 17:
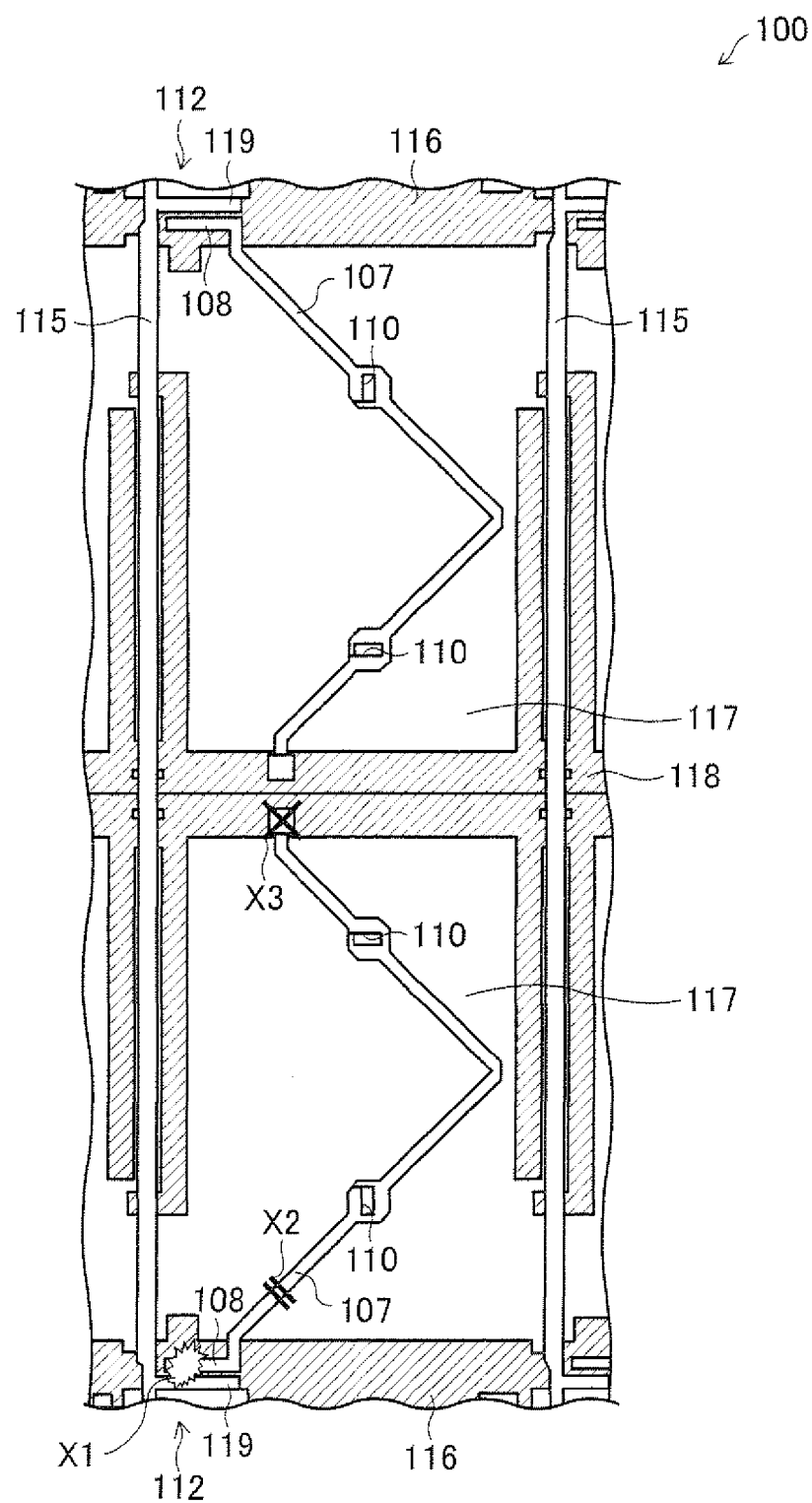

FIG. 17 is a (perspective) plan view partially illustrating an example arrangement of a conventional active matrix substrate.

DESCRIPTION OF EMBODIMENTS

One embodiment of the present invention is described below with reference to the drawings.

(First Example Arrangement of Active Matrix Substrate)

Figure 1:
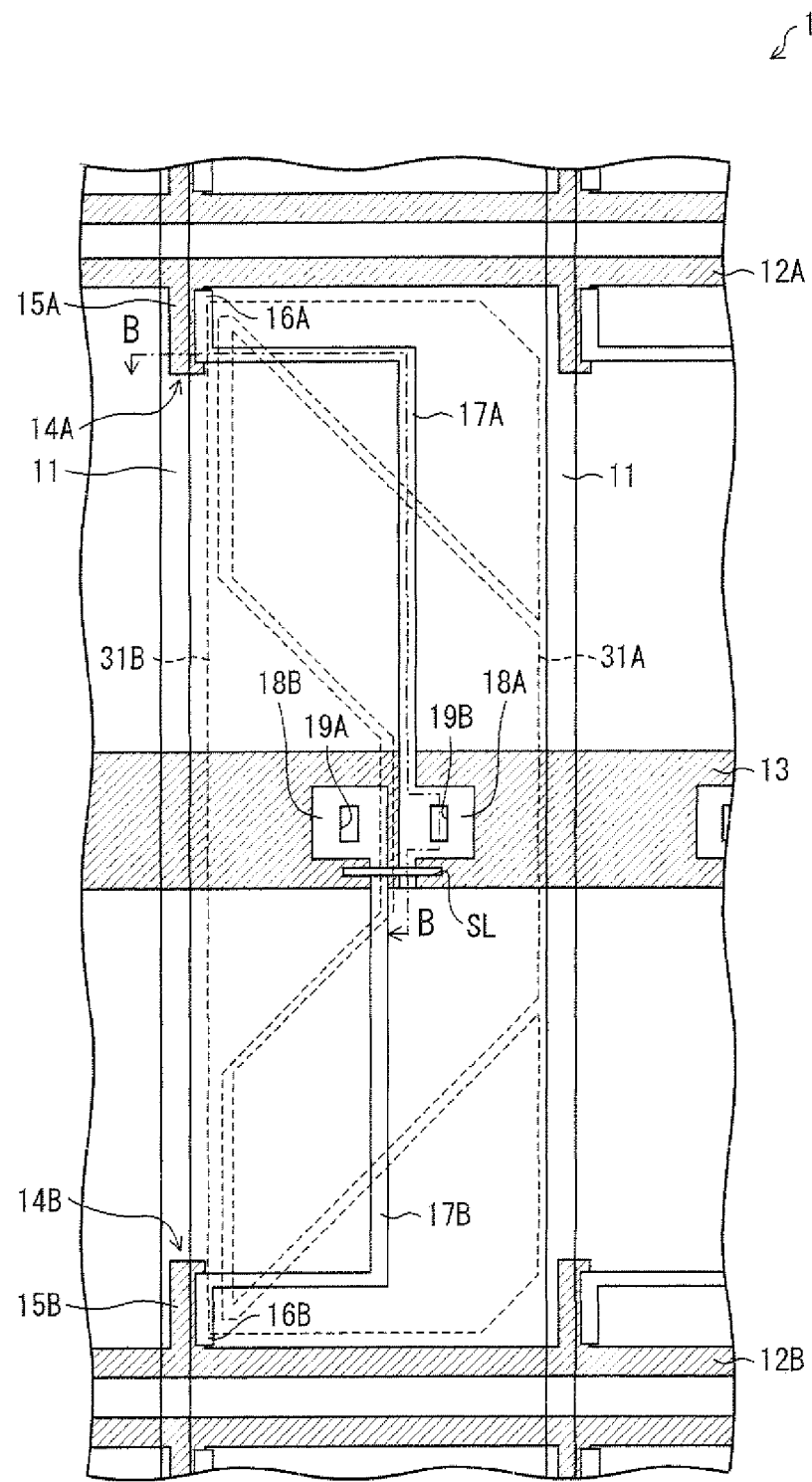
FIG. 1 is a (perspective) plan view partially illustrating a first example arrangement of an active matrix substrate in accordance with an embodiment of the present invention.

FIG. 1 is a (perspective) plan view partially illustrating a first example arrangement of an active matrix substrate according to the present embodiment. The active matrix substrate 1 illustrated in FIG. 1 is of a pixel-segmented (multi-pixel drive) type, in which each pixel includes two sub pixel electrodes 31A and 31B. In a case where a liquid crystal panel is constituted by the active matrix substrate 1, (i) a first sub pixel capacitance is defined by the sub pixel electrode 31A, a counter electrode (common electrode) on a color filter substrate, and a liquid crystal layer which is sandwiched between the two electrodes, whereas (ii) a second sub pixel capacitance is defined by the sub pixel electrode 31B, the counter electrode, and the liquid crystal layer between the two electrodes.

The present embodiment assumes that the liquid crystal layer is a vertical alignment liquid crystal layer including a nematic liquid crystal material having negative dielectric anisotropy. Specifically, each of the active matrix substrate 1 and the color filter substrate has a surface which faces the liquid crystal layer and on which an alignment film is provided for aligning liquid crystal molecules vertically to the surface. This arrangement causes a liquid crystal display device of the present embodiment to function as a VA liquid crystal display device. Namely, the liquid crystal molecules in the liquid crystal layer are aligned substantially vertically to the surfaces of the respective substrates in a state where no voltage is being applied. In such a state, there is substantially no rotation, in the liquid crystal layer, of a polarization plane of light which has entered into the liquid crystal panel. In contrast, in a state where a voltage is being applied, the liquid crystal molecules are oriented so as to have an angle in response to an applied voltage, with respect to a direction perpendicular to the surfaces of the respective substrates. In such a state, there is a rotation, in the liquid crystal layer, of a polarization plane of light that has entered into the liquid crystal panel. The liquid crystal display device includes two polarizing plates: one on a side into which light enters and the other on a side from which light is emitted. By providing the two polarizing plates so that their polarization axes meet a crossed Nichol relation, it is possible to realize a normally black display, in which a black display is carried out while no voltage being is applied, whereas a white display is carried out while a voltage is being applied. Further, the sub pixel electrodes 31A and 318 cause formation of a plurality of regions whose liquid crystal molecules have respective different orientations, while a voltage is being applied. This provides a VA liquid crystal display device in which each pixel has a plurality of regions whose liquid crystal molecules have respective different orientations.

Note that the present invention is not limitedly applicable to a vertical alignment liquid crystal display device as described above. The present invention is also applicable to a twist alignment liquid crystal display device whose liquid crystal layer includes a nematic liquid crystal material having positive dielectric anisotropy.

The active matrix substrate 1 includes (i) a plurality of data signal lines 11 provided so as to extend parallel to one another, (ii) a plurality of scanning signal lines 12A and 12B provided so as to extend parallel to one another in a direction perpendicular to the data signal lines 11, and (iii) a plurality of retention capacitor lines (CS lines) 13 provided so as to extend parallel to one another in the direction perpendicular to the data signal lines 11. In the example illustrated in FIG. 1, the data signal lines 11 are formed so as to extend in a column direction (longitudinal direction), whereas the scanning signal lines 12A and 12B and the retention capacitor lines 13 are formed so as to extend in a row direction (lateral direction).

Each pixel corresponds to a region (pixel region) defined by (i) two data signal lines 11 and 11 adjacent to each other, (ii) a corresponding scanning signal line 12A, and (iii) a corresponding scanning signal line 123. The pixel region includes the sub pixel electrodes 31A and 31B formed in an interwoven shape. Further, a retention capacitor line 13 is provided so as to extend, in a vicinity of a center of the pixel region, in the lateral direction. In other words, the corresponding scanning signal line 12A, the retention capacitor line 13, and the corresponding scanning signal line 12B are provided in this order so as to extend parallel to one another. This combination is sequentially repeated in the column direction.

A TFT 14A is provided in a vicinity of an intersection of a corresponding one of the data signal lines 11 and the scanning signal line 12A, whereas a TFT 14B is provided in a vicinity of an intersection of the corresponding data signal line 11 and the scanning signal line 12B. The TFT 14A includes a gate electrode 15A, a drain electrode 16A, and a source electrode. The TFT 14B includes a gate electrode 15B, a drain electrode 163, and, a source electrode.

The gate electrodes 15A and 15B are constituted by respective parts drawn from the scanning signal lines 12A and 123. The source electrodes are constituted by parts of the data signal line 11. Wires 17A and 17B drawn from the respective drains are formed so as to extend in the pixel region from the respective drain electrodes 16A and 16B to a region in which the retention capacitor line 13 is provided. The wires 17A and 17B are connected with retention capacitor upper electrodes 18A and 18B, respectively, which are provided in regions directly above the retention capacitor line 13. A retention capacitance is formed between the retention capacitor line 13 and the respective retention capacitor upper electrodes 18A and 18B.

The retention capacitor upper electrodes 18A and 18B have contact holes 19A and 19B, respectively. The retention capacitor upper electrode 18A and the sub pixel electrode 31A are electrically connected with each other via the contact hole 19A, whereas the retention capacitor upper electrode 18B and the sub pixel electrode 31B are electrically connected with each other via the contact hole 19B.

Figure 2:
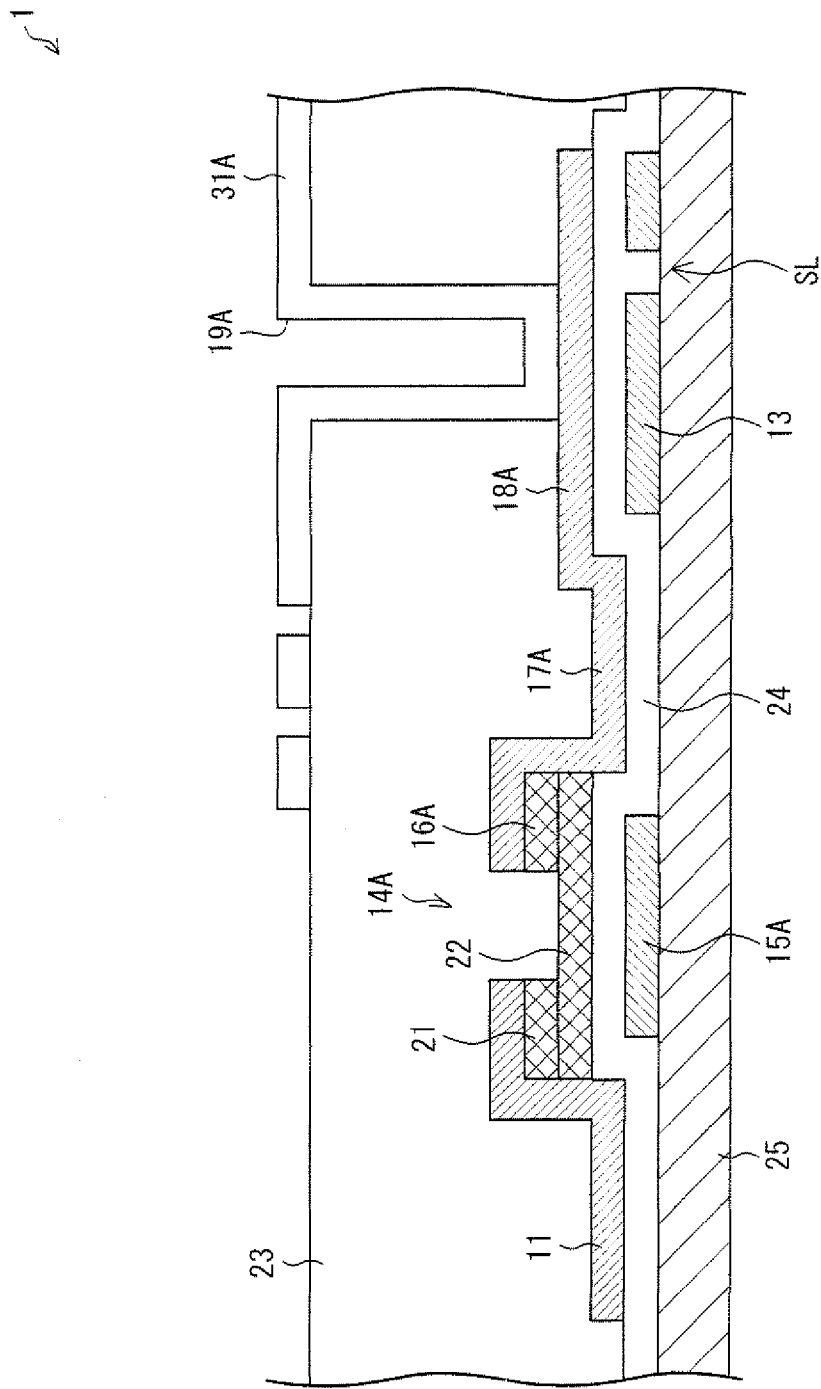
FIG. 2 is a cross-sectional view taken along line B-B of FIG. 1.

FIG. 2 is a cross-sectional view taken along line B-B of FIG. 1. According to the active matrix substrate 1 (see FIG. 2), (i) the gate electrode 15A and the retention capacitor line 13 are first formed on a light-transmitting substrate 25, (ii) are covered by a gate insulating film 24, (iii) a semiconductor layer 22 is formed on the gate insulating film 24 in a region above the gate electrode 15A, and (iv) the source electrode 21 and the drain electrode 16A are formed on the semiconductor layer 22. The TFT 14A is thus formed. A data signal line 11 is stacked on the source electrode 21 so as to be electrically connected with the source electrode 21. The wire 17A is stacked on the drain electrode 16A so as to be electrically connected with the drain electrode 16A.

The retention capacitor upper electrode 18A is formed on the gate insulating film 24 in a region above the retention capacitor line 13. As mentioned above, the retention capacitance is formed between the retention capacitor upper electrode 18A and the retention capacitor line 13.

Then, an interlayer insulating film 23 is formed so as to cover the data signal line 11, the TFT 14A, the wire 17A, and the retention capacitor upper electrode 18A. The sub pixel electrode 31A is formed on the interlayer insulating film 23. The contact hole 19A, via which the sub pixel electrode 31A is electrically connected with the retention capacitor upper electrode 18A, is formed on the retention capacitor upper electrode 18A so as to penetrate the interlayer insulating film 23. Note that the sub pixel electrode 31A is coated with an alignment film (not shown).

The gate electrode 15B, the drain electrode 16B, the TFT 14B, the wire 17B, the retention capacitor upper electrode 18B, the sub pixel electrode 313, and the contact hole 19B are stacked in a manner (not shown) similar to the above.

With the arrangement, it is possible that a display state caused by the sub pixel electrode 31A is different from that caused by the sub pixel electrode 31B, by causing an ON-period during which a gate ON signal is supplied to the scanning signal line 12A to be different from an ON-period during which a gate ON signal is supplied to the scanning signal line 12B, while an identical signal potential is being supplied from the data signal line 11 to the sub pixel electrodes 31A and 31B. This allows, within a single pixel, a formation of two regions which differ from each other in how a voltage is applied, thereby ultimately giving rise to a desirable viewing angle characteristic during a halftone display.

Figure 3:
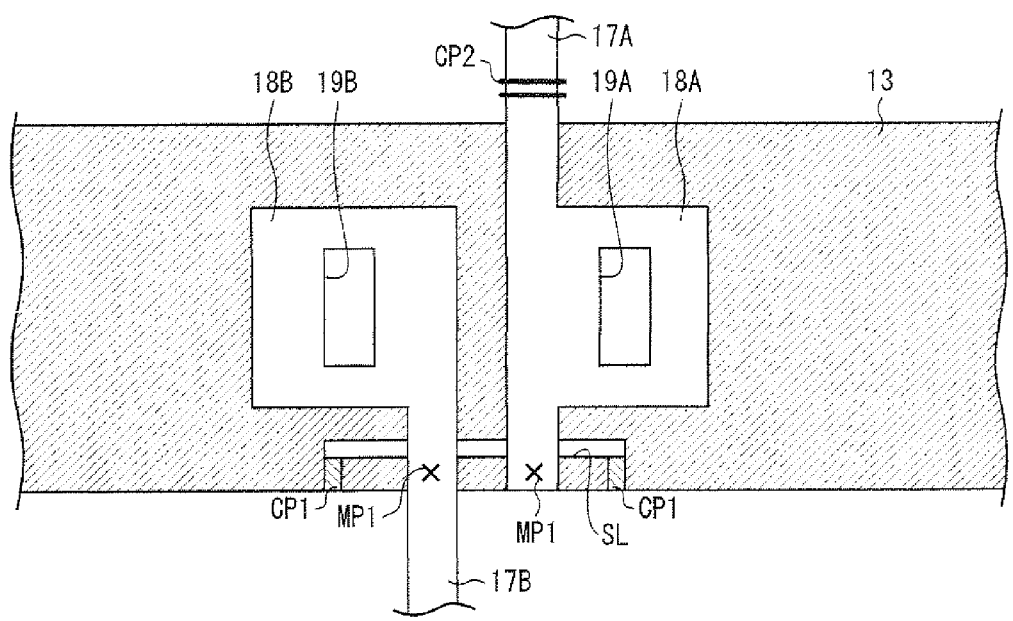
FIG. 3 is a plan view illustrating a region in which a retention capacitor upper electrode is formed, and a portion of a retention capacitor line, the portion surrounding the region.

The following description deals with slits SL formed in the retention capacitor line 13. FIG. 3 is a plan view illustrating (i) regions of the retention capacitor line 13 in which regions the retention capacitor upper electrodes 18A and 18B are formed and (ii) their respective neighboring regions. As illustrated in FIG. 3, the retention capacitor line 13 has a slit SL having its longitudinal direction parallel to a direction in which the retention capacitor line 13 extends.

The slit SL is an aperture shaped so as to penetrate the retention capacitor line 13 in a thickness direction (in a stacking direction; in a direction perpendicular to the substrate) of the retention capacitor line 13. When viewed in the direction perpendicular to the substrate, the slit SL has a shape of a rectangle having its longitudinal direction parallel to the direction in which the retention capacitor line 13 extends. The slit SL does not necessarily have a shape of a rectangle when viewed in the direction perpendicular to the substrate. Alternatively, the shape can be a rectangle having corners which are canted off, or a rectangle having rounded corners.

Further, the slit SL is provided so as to include, when viewed in the direction perpendicular to the substrate, both of (i) a region in which at least one of the retention capacitor upper electrode 18A and the wire 17A is formed and (ii) a region in which at least one of the retention capacitor upper electrode 18B and the wire 1713 is formed.

(Method for Repairing Pixel Defects in First Example Arrangement)

It is assumed with regard to the above arrangement that a short circuit (leak) has occurred between the source electrode and the drain electrode 16A of the TFT 14A, due to a foreign object and/or a film residue, for example. Such a TFT defect causes a voltage, which is being applied to the data signal line 11, to be constantly applied to the sub pixel electrode 31A regardless of whether a gate pulse signal is applied. This results in an occurrence of a pixel defect in the liquid crystal display device. The following description deals with how such a defect can be repaired.

A repairing process includes three steps described below. The three steps are carried out in an order that is not particularly limited. Thus, they may be carried out in any order.

In the first step, the wire 17A is partially cut so as to block an electrical connection between the sub pixel electrode 31A and the drain electrode 16A in which the short circuit has occurred. In the example illustrated in FIG. 3, the wire 17A is cut at a part indicated by CP2. Note that the wire 17A can be cut at any part, provided that the electrical connection between the drain electrode 16A and the sub pixel electrode 31A is blocked. In other words, the wire 17A can be cut at any part between the drain electrode 16A and an area where the contact hole 19A is provided.

The above cutting (fracture separation) is carried out by laser beam irradiation from a front side of the active matrix substrate 1. A laser beam to be used is not particularly limited. For example, a YAG (yttrium aluminum garnet) laser beam can be used. In this case, a wavelength such as a wavelength of the fourth higher harmonic wave (wavelength of 266 nm) of the YAG laser beam can be used.

In the second step, a region, surrounded by (i) the slit SL and (ii) a side surface of the retention capacitor line 13 which side surface extends in a direction in which the retention capacitor line 13 extends, is electrically separated from the retention capacitor line 13. In the example illustrated in FIG. 3, regions CP1 of the retention capacitor line 13 which extend from respective end parts of the slit SL toward the side surface of the retention capacitor line 13 are cut. This allows a part of the retention capacitor line 13 to be formed as a separated region which is electrically separated from the retention capacitor line 13. The cutting of the retention capacitor line 13 should be carried out so that (i) the region in which at least one of the retention capacitor upper electrode 18A and the wire 17A is formed and (ii) the region in which at least one of the retention capacitor upper electrode 18B and the wire 17B is formed, are above the separated region. In the example illustrated in FIG. 3, parts of the respective wires 17A and 176 are above the separated region. The cutting of the retention capacitor line 13 is carried out by the laser beam irradiation as in the above.

In the third step, short-circuiting is carried out between (i) the separated region formed or to be formed during the second step and (ii) respective of (a) at least one of the retention capacitor upper electrode 18A and the wire 17A at a portion located directly above the separated region and (b) at least one of the retention capacitor upper electrode 186 and the wire 17B at a portion located directly above the separated region. In the example illustrated in FIG. 3, the short-circuiting is carried out (i) in a region MP1 where the wire 17A and the separated region overlap each other and (ii) in another region MP1 where the wire 17B and the separated region overlap each other.

The above short-circuiting is carried out by irradiating a laser beam from the front side of the active matrix substrate 1. A laser beam to be used is not particularly limited. For example, the YAG laser beam can be used. In this case, a wavelength such as a wavelength of the second higher harmonic wave (wavelength of 532 nm) of the YAG laser beam can be used.

The repairing process causes the following electrical connection in the pixel: The first step causes the electrical disconnection between the sub pixel electrode 31A and the drain electrode 16A in which the short-circuiting defect has occurred. This eliminates the state in which the voltage of the data signal line 11 is constantly applied to the sub pixel electrode 31A.

The second step causes the formation of the separated region. The third step causes the electrical connection of the wires 17A and 17B via the separated region. This causes the sub pixel electrode 31A to receive, via the separated region and the wire 17A, a voltage which is substantially the same voltage as a voltage applied from the properly functioning TFT 14B to the sub pixel electrode 31B via the wire 17B.

In the normal state, as described above, an identical signal potential is being supplied to both the sub pixel electrodes 31A and 31B, while a gate ON signal is supplied during different periods. This causes the display state caused by the sub pixel electrode 31A to be different from that caused by the sub pixel electrode 31B. In contrast, after the repairing process, an identical signal potential is supplied to both the sub pixel electrodes 31A and 31B, while a gate ON signal is supplied during the same period. This causes their respective display states to be completely identical to each other. In other words, the repairing process permits no formation of the two regions within a single pixel where respective display states are different from each other. However, the repairing process causes the repaired sub pixel electrode 31A to be involved in a display corresponding to image data to be displayed by the pixel. As a result, it is possible to repair a pixel defect to an extent that the defect is hardly noticeable.

(Second Example Arrangement of Active Matrix Substrate)

Figure 4:
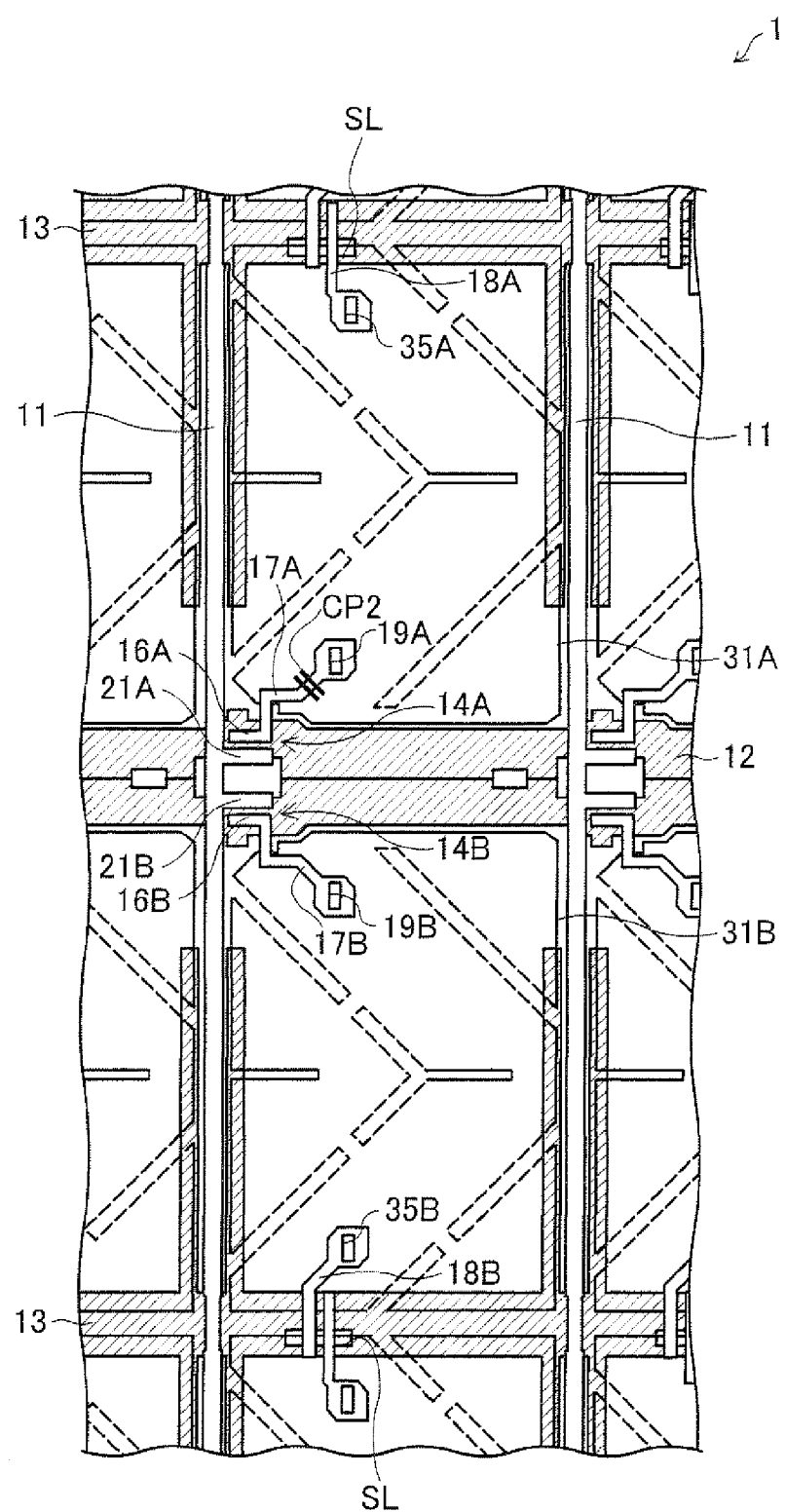
FIG. 4 is a (perspective) plan view partially illustrating a second example arrangement of the active matrix substrate in accordance with the embodiment of the present invention.

FIG. 4 is a (perspective) plan view partially illustrating a second example arrangement of the active matrix substrate according to the present embodiment. As in the first example arrangement, the active matrix substrate 1 of the second example arrangement is of a pixel-segmented type, in which each pixel includes two sub pixel electrodes 31A and 31B. In a case where a liquid crystal panel is constituted by the active matrix substrate 1, first and second sub pixel capacitances are included in the liquid crystal panel as follows. Namely, (i) the first sub pixel capacitance is formed by the sub pixel electrode 31A, a counter electrode (common electrode) on a color filter substrate, and a liquid crystal layer between the two electrodes, and (ii) the second sub pixel capacitance is formed by the sub pixel electrode 31B, the counter electrode, and the liquid crystal layer between the two electrodes.

The active matrix substrate 1 includes (i) a plurality of data signal lines 11 provided so as to extend parallel to one another, (ii) a plurality of scanning signal lines 12 provided so as to extend parallel to one another in a direction perpendicular to the data signal lines 11, and (iii) a plurality of retention capacitor lines (CS lines) 13 provided so as to extend parallel to one another in the direction perpendicular to the data signal lines 11. In the example illustrated in FIG. 4, the data signal lines 11 are formed so as to extend in a column direction (longitudinal direction), whereas the scanning signal lines 12 and the retention capacitor lines 13 are formed so as to extend in a row direction (lateral direction).

Each pixel corresponds to a region (pixel region) defined by (i) two data signal lines 11 and 11 adjacent to each other, and (ii) two retention capacitor lines 13 and 13 adjacent to each other. The pixel region includes the sub pixel electrodes 31A and 31B provided adjacent to each other in the longitudinal direction. Further, a scanning signal line 12 is provided so as to extend, in a vicinity of a center of the pixel region, in the lateral direction.

TFTs 14A and 14B are provided in a vicinity of an intersection of a corresponding one of the data signal lines 11 and the scanning signal line 12. The TFT 14A includes a gate electrode, a drain electrode 16A, and a source electrode 21A. The TFT 14B includes a gate electrode, a drain electrode 16B, and a source electrode 21B.

The gate electrodes are constituted by respective parts of the scanning signal line 12. The source electrodes 21A and 21B are constituted by parts drawn from the corresponding data signal line 11.

A wire 17A is formed so as to extend from the drain electrode 16A to a region in which the sub pixel electrode 31A is formed. The wire 17A has a contact hole 19A, through which the wire 17A and the sub pixel electrode 31A are electrically connected with each other. Similarly, a wire 17B is formed so as to extend from the drain electrode 16B to a region in which the sub pixel electrode 31B is formed. The wire 17B has a contact hole 19B, through which the wire 17B and the sub pixel electrode 31B are electrically connected with each other.

Further, retention capacitor upper electrodes 18A and 18B are each formed above a region in which one of the retention capacitor lines 13 is formed. The retention capacitor upper electrode 18A extends to a region in which the sub pixel electrode 31A is formed. In this region, the retention capacitor upper electrode 18A has a contact hole 35A, through which the retention capacitor upper electrode 18A and the sub pixel electrode 31A are electrically connected with each other. Similarly, the retention capacitor upper electrode 18B extends to a region in which the sub pixel electrode 31B is formed. In this region, the retention capacitor upper electrode 18B has a contact hole 35B, through which the retention capacitor upper electrode 18B and the sub pixel electrode 31B are electrically connected with each other.

According to the present example arrangement 2, the active matrix substrate 1 has a cross sectional arrangement which is essentially identical to that shown in FIG. 2. The example arrangements 1 and 2 differ from each other in that the wire 17A and the retention capacitor upper electrode 18A of the example arrangement 1 are electrically connected with each other directly, whereas those of the example arrangement 2 are electrically connected via the contact hole 19A, the sub pixel electrode 31A, and the contact hole 35A.

According to the arrangement, an identical signal potential is supplied to the sub pixel electrodes 31A and 31B via the data signal line 11, while a CS signal to be supplied to the retention capacitor line 13 is being changed in synchronization with timing at which a gate ON signal is supplied. This allows display states caused by the respective sub pixel electrodes 31A and 31B to differ from each other. Consequently, according to a liquid crystal display device including the present active matrix substrate 1, it is possible to form, within a single pixel, two regions where respective different voltages are applied. This in turn allows a good viewing angle characteristic during a halftone display.

Figure 5:
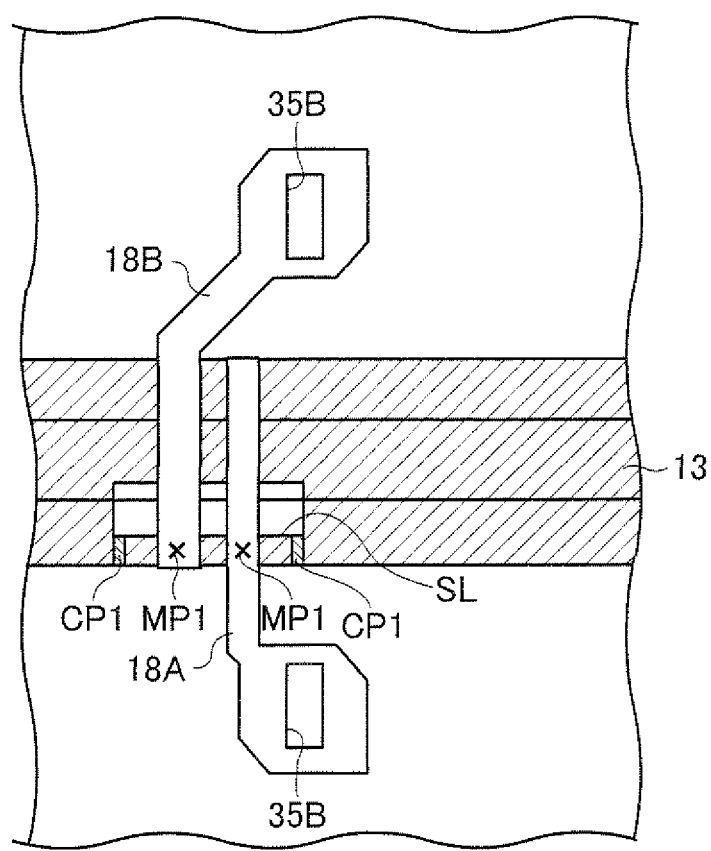
FIG. 5 is a plan view illustrating a region in which a retention capacitor upper electrode is formed, and a portion of a retention capacitor line, the portion surrounding the region.

The following description deals with slits SL formed in the retention capacitor line 13. FIG. 5 is a plan view illustrating (i) regions of the retention capacitor line 13, in which regions the retention capacitor upper electrodes 18A and 18B are formed, and (ii) their respective neighboring regions. As illustrated in FIG. 5, the retention line 13 has a slit SL whose longitudinal direction is parallel to a direction in which the retention capacitor line 13 extends.

The slit SL is an aperture shaped so as to penetrate the retention capacitor line 13 in a thickness direction (in a stacking direction; in a direction perpendicular to the substrate) of the retention capacitor line 13. When viewed in the direction perpendicular to the substrate, the slit SL has a shape of a rectangle having its longitudinal direction parallel to the direction in which the retention capacitor line 13 extends. The slit SL does not necessarily have a shape of a rectangle when viewed in the direction perpendicular to the substrate. Alternatively, the shape can be a rectangle having corners which are canted off, or a rectangle having rounded corners.

The slit SL is formed so that the slit SL and the regions in which the respective retention capacitor upper electrodes 18A and 18B are formed overlap each other when viewed in the direction perpendicular to the substrate.

(Method for Repairing Pixel Defects in Second Example Arrangement)

It is assumed with regard to the above arrangement that a short circuit (leak) has occurred between the source electrode 21A and the drain electrode 16A of the TFT 14A due to a foreign object and/or a film residue, for example. Such a TFT defect causes a voltage, which is being applied to the data signal line 11, to be constantly applied to the sub pixel electrode 31A regardless of whether a gate pulse signal is applied. This results in an occurrence of a pixel defect in the liquid crystal display device. The following description deals with how such a defect can be repaired.

A repairing process includes three steps described below. The three steps are carried out in an order that is not particularly limited. Thus, they may be carried out in any order.

In the first step, the wire 17A is partially cut so as to block an electrical connection between the sub pixel electrode 31A and the drain electrode 16A in which the short circuit has occurred. In the example illustrated in FIG. 4, the wire 17A is cut at a part indicated by CP2. Note that the wire 17A can be cut at any part, provided that the electrical connection between the drain electrode 16A and the sub pixel electrode 31A is blocked. In other words, the wire can be cut at any part between the drain electrode 16A and an area where the contact hole 19A is provided. The above cutting (fracture splitting) of the electrode is carried out by laser beam irradiation as in the above.

In the second step, a region, surrounded by (i) the slit SL and (ii) a side surface of the retention capacitor line 13 which side surface extends in a direction in which the retention capacitor line 13 extends, is electrically separated from the retention capacitor line 13. In the example illustrated in FIG. 5, regions CP1 of the retention capacitor line 13 which extend from respective end parts of the slit SL toward the side surface of the retention capacitor line 13 are cut. This allows a part of the retention capacitor line 13 to be formed as a separated region which is electrically separated from the retention capacitor line 13. The cutting of the retention capacitor line 13 should be carried out so that (i) a region in which the retention capacitor upper electrode 18A is formed and (ii) a region in which the retention capacitor upper electrode 18B is formed, are above the separated region. The cutting of the retention capacitor line 13 is carried out by the laser beam irradiation as in the above.

In the third step, short-circuiting is carried out between (i) the separated region formed or to be formed during the second step and (ii) respective of (a) the retention capacitor upper electrode 18A at a portion located directly above the separated region and (b) the retention capacitor upper electrode 18B at a portion located directly above the separated region. In the example illustrated in FIG. 5, the short-circuiting is carried out (i) in a region MP1 where the retention capacitor upper electrode 18A and the separated region overlap each other and (ii) in another region MP1 where the retention capacitor upper electrode 18B and the separated region overlap each other. The above short-circuiting of the electrodes is carried out by laser beam irradiation from a front side of the active matrix substrate 1.

The repairing process causes the following electrical connection in the pixel: The first step causes the electrical disconnection between the sub pixel electrode 31A and the drain electrode 16A in which the short-circuiting defect has occurred. This eliminates the state in which the voltage of the data signal line 11 is constantly applied to the sub pixel electrode 31A.

The second step causes the formation of the separated region. The third step causes the electrical connection of the retention capacitor upper electrodes 18A and 18B via the separated region. This causes the sub pixel electrode 31A to receive, via the separated region and the retention capacitor upper electrode 18A, a voltage which is substantially the same voltage as a voltage applied from the properly functioning TFT 14B to the sub pixel electrode 31B via the wire 17B.

It should be noted that a voltage, to be applied to a sub pixel electrode 31A that has been subjected to the repairing process, is applied, in a normal state, to a sub pixel electrode 31B of a pixel adjacent to the pixel including the above sub pixel electrode 31A. The repairing process therefore causes a target pixel to be repaired and a pixel (adjacent pixel) adjacent to the target pixel to have the following respective display states: One of sub pixel electrodes in the adjacent pixel has an approximately double area. It follows that an area of the adjacent pixel becomes approximately 1.5 times as large as that of the adjacent pixel that has not been subjected to the repairing process. On the other hand, one of sub pixel electrodes in the target pixel no longer exists. It follows that an area of the target pixel becomes approximately half as large as that of the target pixel that has not been subjected to the repairing process. However, pixels adjacent to each other normally have pieces of image data to be displayed which are not largely different from each other. As a result, it is possible to repair a pixel defect to the extent that the defect is hardly noticeable.

(Third Example Arrangement of Active Matrix Substrate)

Figure 6:
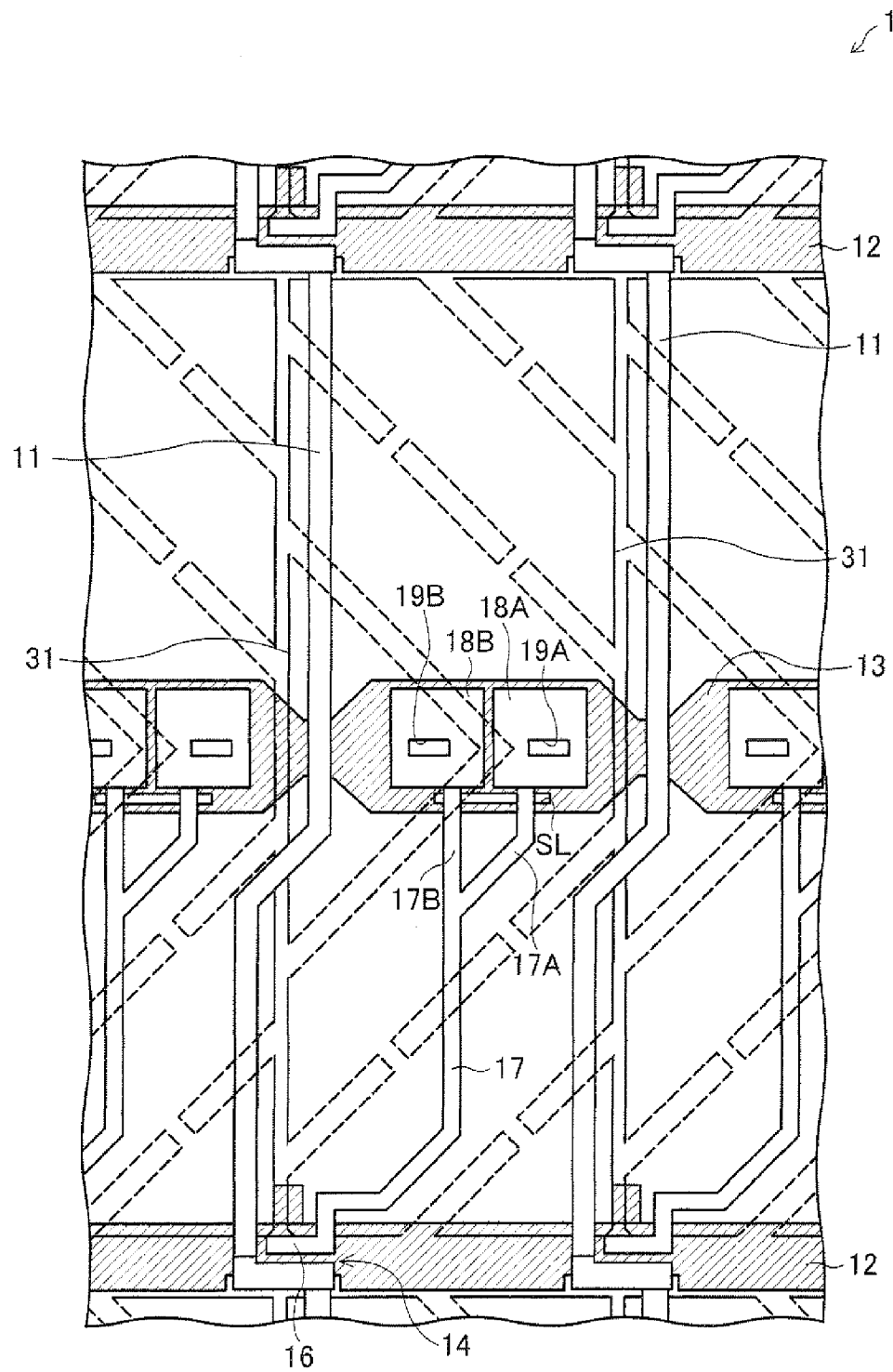
FIG. 6 is a (perspective) plan view partially illustrating a third example arrangement of the active matrix substrate in accordance with an embodiment of the present invention.

FIG. 6 is a (perspective) plan view partially illustrating a third example arrangement of an active matrix substrate according to the present embodiment. The active matrix substrate 1 of the third example arrangement is not of a pixel-segmented type, i.e., includes pixels each including a single pixel electrode 31. In a case where a liquid crystal panel is constituted by the active matrix substrate 1, a pixel capacitance is included in the liquid crystal panel as follows. Namely, the pixel capacitance is formed by the pixel electrode, a counter electrode (common electrode) on a color filter substrate, and a liquid crystal layer between the two electrodes.

The active matrix substrate 1 includes (i) a plurality of data signal lines 11 provided so as to extend parallel to one another, (ii) a plurality of scanning signal lines 12 provided so as to extend parallel to one another in a direction perpendicular to the data signal lines 11, and (iii) a plurality of retention capacitor lines (CS lines) 13 provided so as to extend parallel to one another in the direction perpendicular to the data signal lines 11. In the example illustrated in FIG. 6, the data signal lines 11 are formed so as to extend in a column direction (longitudinal direction), whereas the scanning signal lines 12 and the retention capacitor lines 13 are formed so as to extend in a row direction (lateral direction).

Each pixel corresponds to a region (pixel region) defined by (i) two data signal lines 11 and 11 adjacent to each other, and (ii) two scanning signal lines 12 and 12 adjacent to each other. The pixel region includes the pixel electrode 31 formed therein. Further, a retention capacitor line 13 is provided so as to extend, in a vicinity of a center of the pixel region, in the lateral direction.

A TFT 14 is provided in a vicinity of an intersection of a corresponding one of the data signal lines 11 and a corresponding one of the scanning signal lines 12. The TFT 14 includes a gate electrode, a drain electrode 16, and a source electrode.

The gate electrode is constituted by a part of the scanning signal line 12. The source electrode is constituted by a part of the data signal line 11.

Part of the drain electrode 16 is extended, in the pixel region, to a region in which the retention capacitor line 13 is formed, thereby forming a wire 17. Before reaching this region, the wire 17 branches into two: wires 17A and 17B, which are connected with retention capacitor upper electrodes 18A and 18B, respectively, provided directly above the retention capacitor line 13. A retention capacitance is formed between the retention capacitor upper electrodes 18A and 18B and the retention capacitor line 13.

The retention capacitor upper electrodes 18A and 18B have contact holes 19A and 19B, respectively. The retention capacitor upper electrodes 18A and 18B are electrically connected with their corresponding pixel electrodes 31 via the contact holes 19A and 19B, respectively. The active matrix substrate 1 having the present example arrangement 3 has a cross section essentially identical to that shown in FIG. 2.

Note that the pixel electrode 31 connected with the retention capacitor upper electrode 18A is electrically separated from the pixel electrode 31 connected with the retention capacitor upper electrode 18B. This is essentially intended to prevent the entire pixel region from going into a display defect state, by regarding, as a display defect, only a portion corresponding to a pixel electrode 31 connected with the defective part, if a situation occurs such as a situation in which one of the wires 17A and 17B or one of the retention capacitor upper electrodes 18A and 18B is defective.

Figure 7:
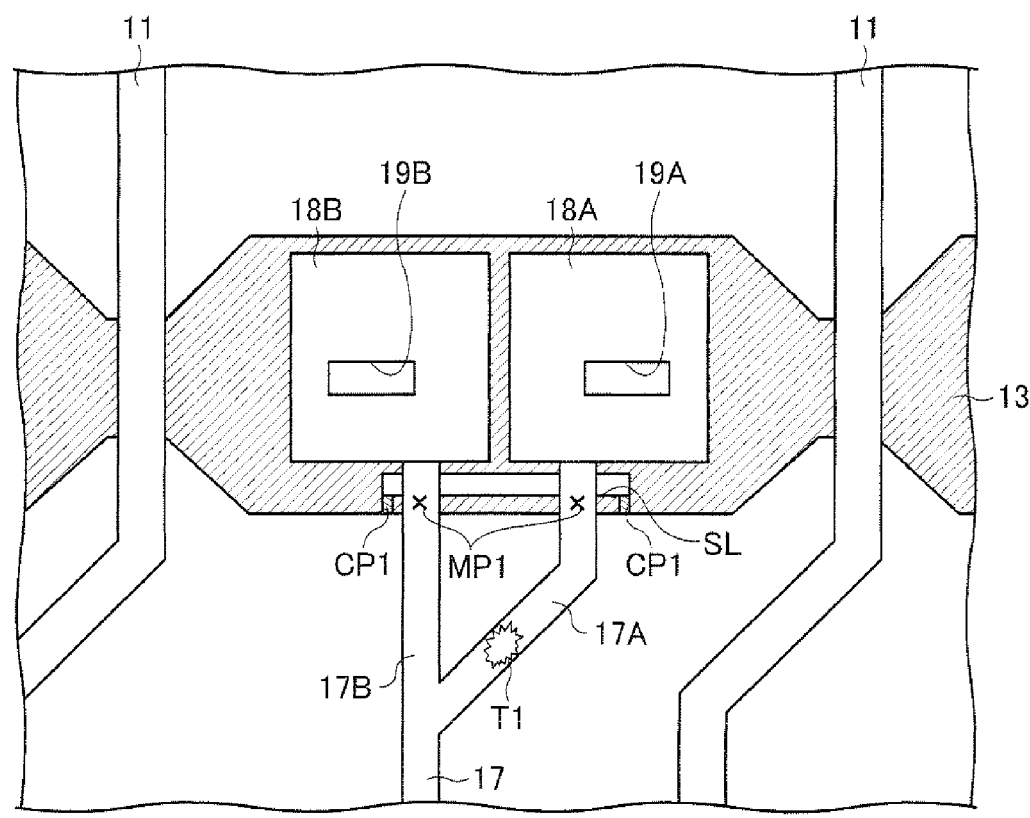
FIG. 7 is a plan view illustrating a region in which a retention capacitor upper electrode is formed, and a portion of a retention capacitor line, the portion surrounding the region.

The following description deals with slits SL formed in each of the plurality of retention capacitor lines 13. FIG. 7 is a plan view illustrating (i) regions of the retention capacitor electrodes 18A and 18B are formed and (ii) their respective neighboring regions. As illustrated in FIG. 7, the retention capacitor line 13 has a slit SL having its longitudinal direction parallel to a direction in which the retention capacitor line 13 extends.

The slit SL is an aperture shaped so as to penetrate the retention capacitor line 13 in a thickness direction (in a stacking direction, in a direction perpendicular to the substrate) of the retention capacitor line 13. When viewed in the direction perpendicular to the substrate, the slit SL has a shape of a rectangle having its longitudinal direction parallel to the direction in which the retention capacitor line 13 extends. The slit SL does not necessarily have a shape of a rectangle when viewed in the direction perpendicular to the substrate. Alternatively, the shape can be a rectangle having corners which are canted off, or a rectangle having rounded corners.

The slit SL is provided so as to include, when viewed in the direction perpendicular to the substrate, both of the region in which the wire 17A is formed and the region in which the wire 17B is formed.

(Method for Repairing Pixel Defects in Third Example Arrangement)

It is assumed with regard to the above arrangement that the wire 17A has been broken due to a foreign object and/or a defective film formation, for example. Such breakage prevents application of a voltage to the pixel electrode 31 electrically connected with the wire 17A. This causes the corresponding pixel to occur as a defective pixel in a liquid crystal display device. The following description deals with how such a defect can be repaired.

A repairing process includes two steps described below. The two steps are carried out in an order that is not particularly limited. Thus, they may be carried out in any order.

In the first step, a region, surrounded by (i) the slit SL and (ii) a side surface of the retention capacitor line 13 which side surface extends in a direction in which the retention capacitor line 13 extends, is electrically separated from the retention capacitor line 13. In the example illustrated in FIG. 7, two regions CP1 of the retention capacitor line 13 which extend from respective end parts of the slit SL toward the side surface of the retention capacitor line 13 are cut. This allows a part of the retention capacitor line 13 to be formed as a separated region which is electrically separated from the retention capacitor line 13. The cutting of the retention capacitor line 13 should be carried out so that (i) a region in which the wire 17A is formed and (ii) a region in which the wire 17B is formed, are above the separated region. The cutting of the retention capacitor line 13 is carried out by the laser beam irradiation as in the above.

In the second step, short-circuiting is carried out between (i) the separated region formed or to be formed during the first step and (ii) respective of (a) the wire 17A at a portion located directly above the separated region and (b) the wire 17B at a portion located directly above the separated region. In the example illustrated in FIG. 7, the short-circuiting is carried out (i) in a region MP1 where the wire 17A and the separated region overlap each other and (ii) in another region MP1 where the wire 17B and the separated region overlap each other. The above short-circuiting of the electrodes is carried out by laser beam irradiation from a front side of the active matrix substrate 1.

Through the above repairing process, the first step allows for the formation of the separated region, while the second step electrically connects the wires 17A and 17B with each other via the separated region. This causes a voltage to be applied from the wire 17B via the separated region to the retention capacitor upper electrode 18A. This in turn allows for achievement of a display state substantially equivalent to a normal display state.

(Change in Retention Capacitance Due to Repair Process)

The following description deals with how the retention capacitance is changed due to the repairing process. (a) of FIG. 8 illustrates an example state of each of the retention capacitor line 13 and the wires 17A and 17B each of which has not been subjected to the repairing process.

In the descriptions of the respective example arrangements, (i) the wires 17A and 17B are treated as members separate from the respective retention capacitor upper electrodes 18A and 18B and (ii) the retention capacitance is formed between the retention capacitor line 13 and the respective retention capacitor upper electrodes 18A and 18B. However, in reality, the wires 17A and 17B are formed so as to be integral with the retention capacitor upper electrodes 18A and 18B, respectively. As such, the retention capacitance is a sum of (i) a retention capacitance formed between (a) the retention capacitor line 13 and (b) the respective wires 17A and 17B in a region where the retention capacitor line 13 and the wires 17A and 17B overlap each other and (ii) a retention capacitance formed between the retention capacitor line 13 and the respective retention capacitor upper electrodes 18A and 18B. In view of this, the following description does not treat the wires 17A and 17B as separate from the retention capacitor upper electrodes 18A and 18B, respectively, and thus they are merely referred to as the wires 17A and 17B.

Figure 8:
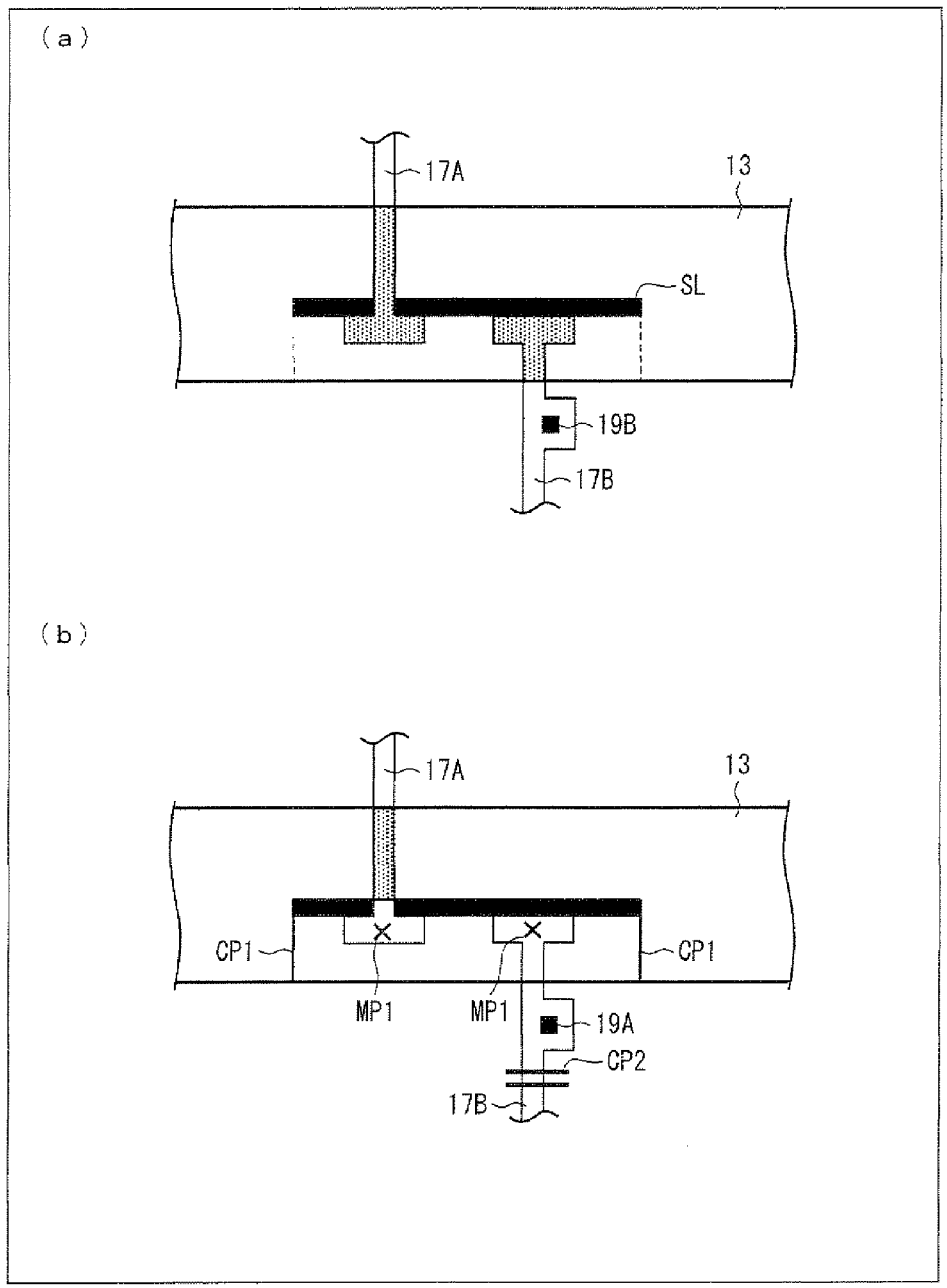
FIG. 8

In the state illustrated in (a) of FIG. 8, a retention capacitance is formed in hatched regions, i.e., in regions where the retention capacitor line 13 and the wires 17A and 17B overlap each other. The repairing process causes a state illustrated in (b) of FIG. 8. Specifically, the wire 17B is cut at a part indicated by CP2; the retention capacitor line 13 is cut at regions indicated by CP1; and the cutout region is short-circuited with the wires 17A and 17B at two regions indicated by MP1, in which the cutout region overlaps the wires 17A and 17B.

The repairing process causes the retention capacitance to be formed in a region where the wire 17A and the retention capacitor line 13 overlap each other. It follows that there occurs a large difference in the retention capacitance due to the repairing process.

A total pixel capacitance Cpixel=Clc+Ccs+Cgd+Csd+ . . . is satisfied, where Cpixel represents the sum of all capacitances within a single pixel, Clc represents a liquid crystal capacitance, Ccs represents the above retention capacitance, Cgd represents a parasitic capacitance between a drain connection line and a scanning signal line; and Csd represents a parasitic capacitance between the drain connection line and a data signal line.

When a given one of Clc, Ccs, Cgd, Csd . . . is a load of a single pixel and the load is represented by a load X, an influence of the load X to the single pixel is represented by X/Cpixel. A proportion of Ccs to the total pixel capacitance is set to be raised so that a signal voltage written in the pixel is retained. In a case where there occurs a reduction in Ccs after the repairing process, a change in the load X (a change due to ITO misalignment, for example, in a case of Cgd or Csd) has a significant impact on a display quality. Further, such a reduction in Ccs naturally leads to a reduction in retention of the signal voltage written in the pixel. This in turn affects a display state. Therefore, a change in the retention capacitance which occurs due to the repairing process is preferably small.

In order to reduce a change which occurs in the retention capacitance due to the repairing process, it is necessary to (i) make small a first area of a region where the wires 17A and 17B and the separated region overlap each other and (ii) make large a second area of a region where the wires 17A and 17B and the retention capacitor line 13 overlap each other outside the separated region. For example, in a case where the second area is larger than the first area, it is possible to make less than 50% a change in the retention capacitance which occurs due to the repairing process.

Figure 9:
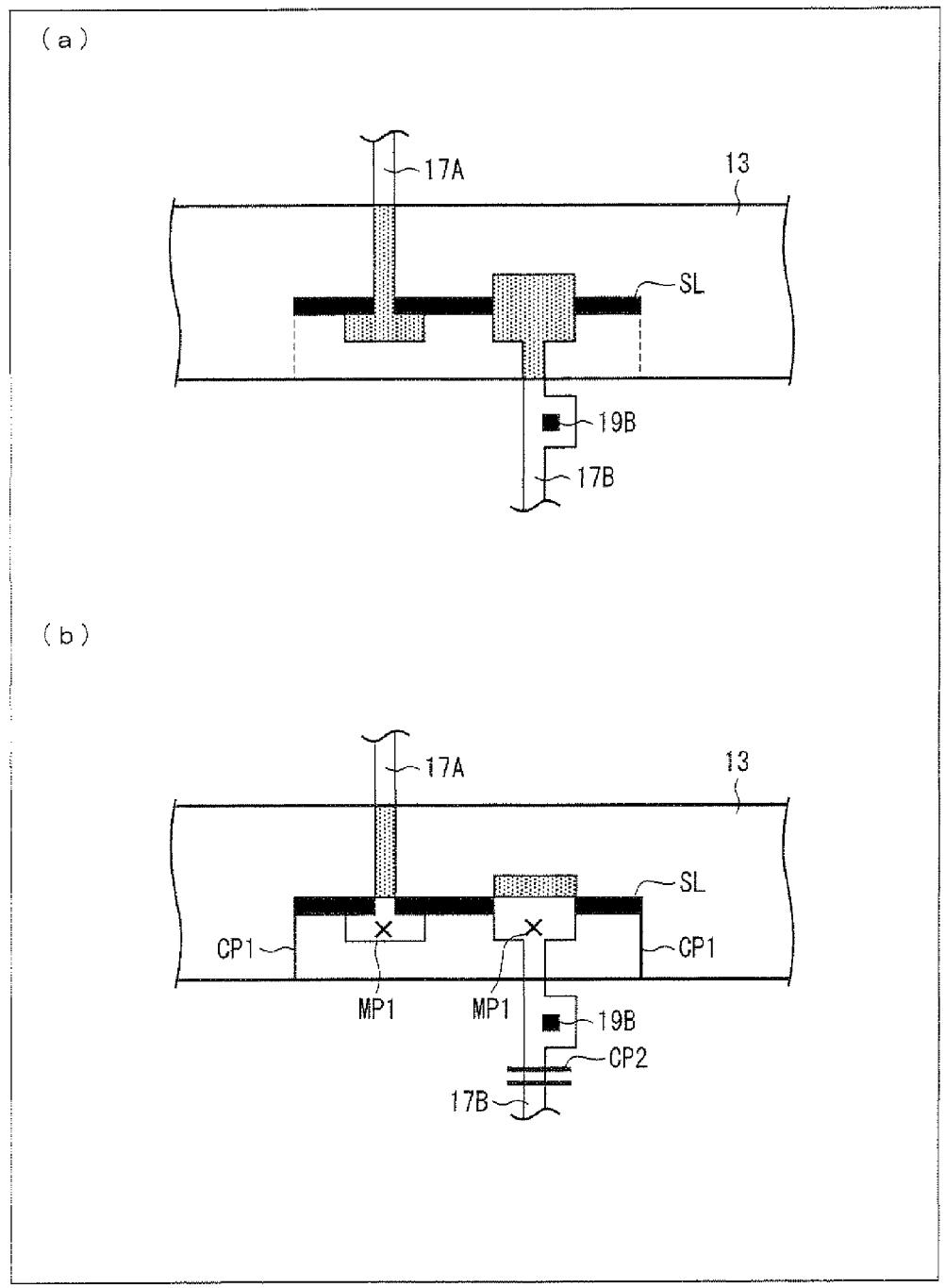

According to an example illustrated in (a) of FIG. 9, the area where the wire 17B and the retention capacitor line 13 overlap each other outside the separated region is made larger in comparison with the example illustrated in (a) of FIG. 8. In a case where the repairing process is carried out with respect to a state illustrated in (a) of FIG. 9, the state is changed into a state illustrated in (b) of FIG. 9. (b) of FIG. 9 shows that it was possible to reduce an amount of change in the retention capacitance which occurs due to the repairing process, in comparison with the state illustrated in (b) of FIG. 8.

Figure 10:
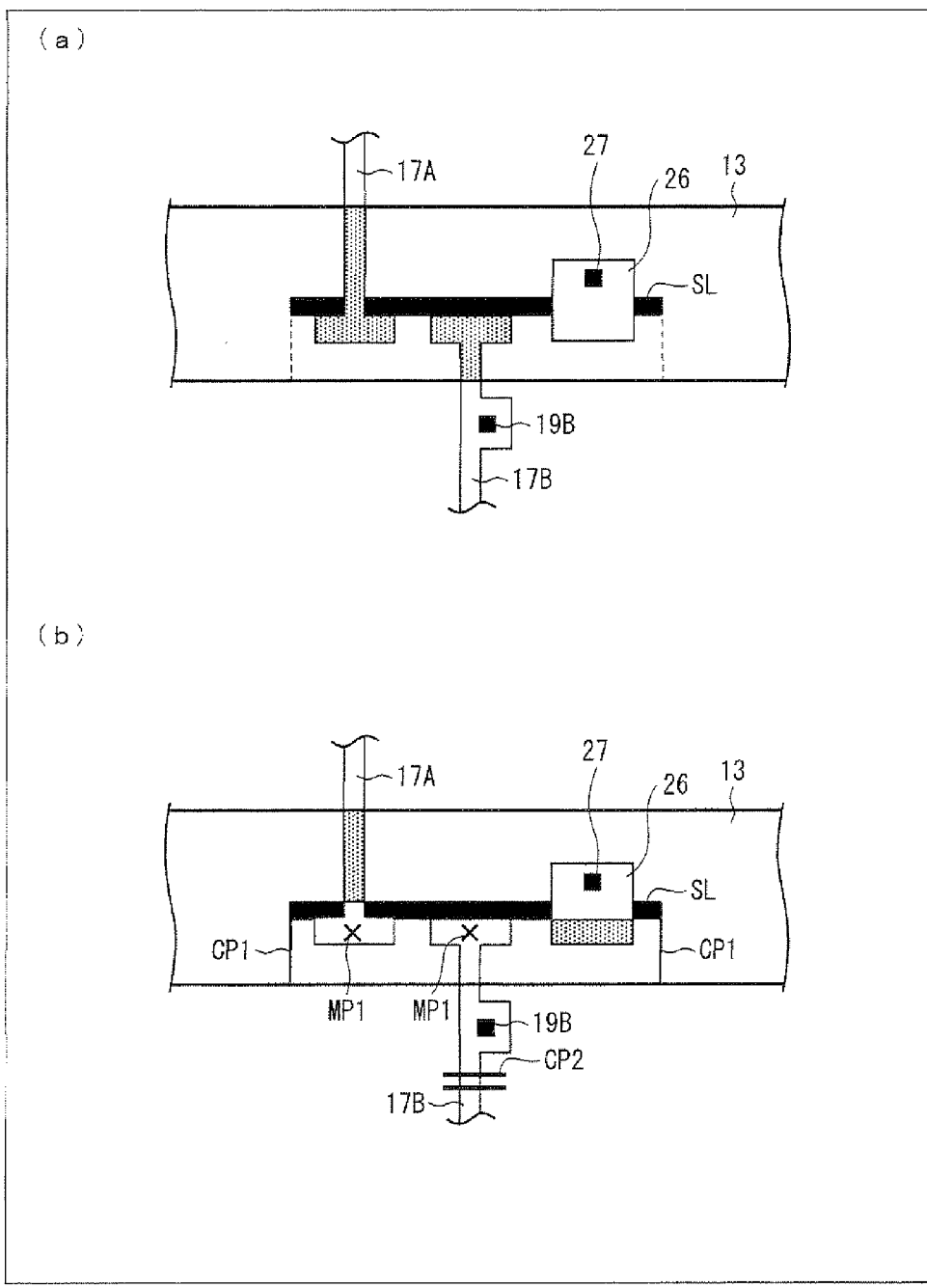
Figure 11:
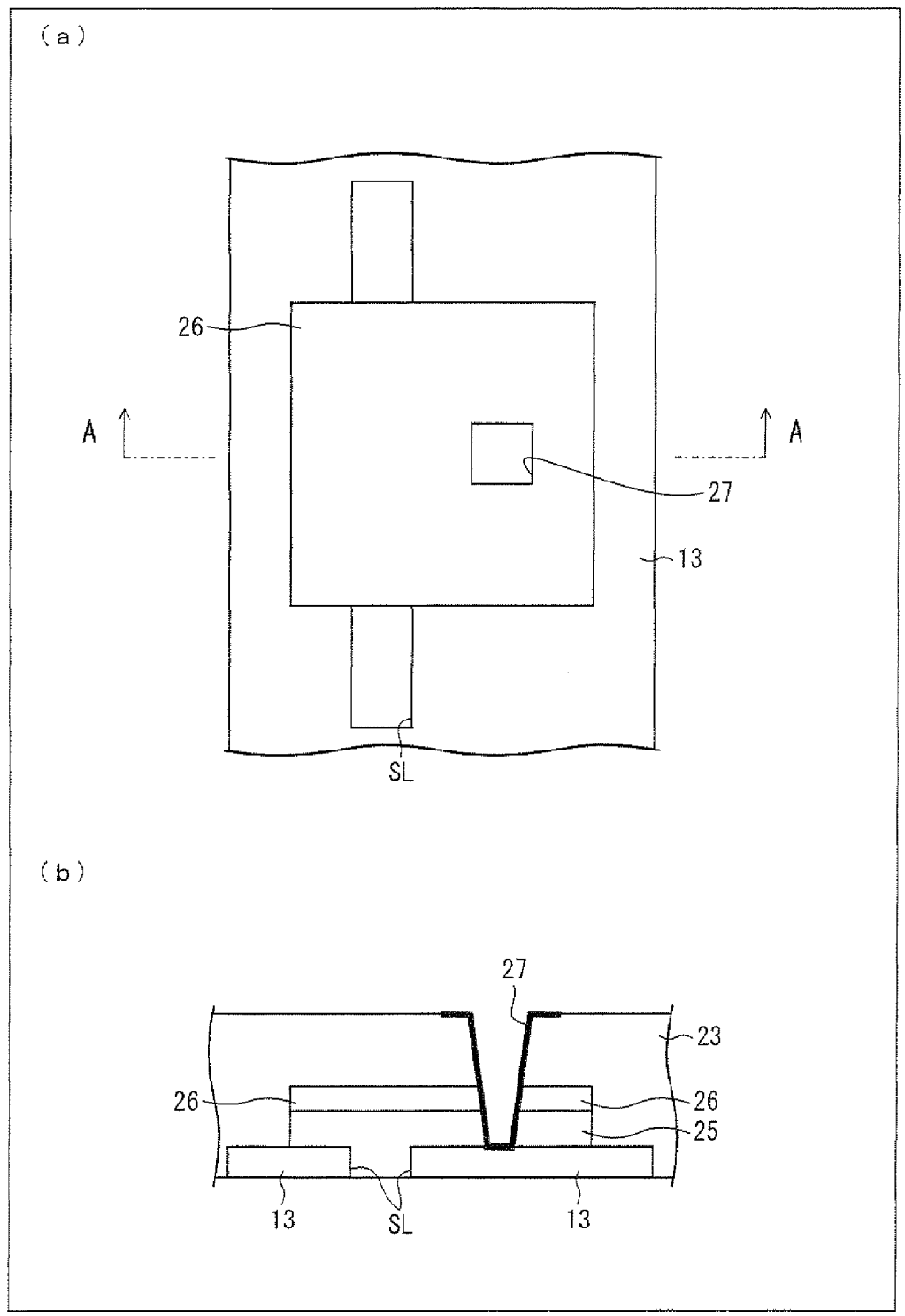

(a) of FIG. 10 also illustrates an example arrangement for reducing the amount of change in the retention capacitance due to the repairing process. The example illustrated in (a) of FIG. 10 includes an auxiliary electrode 26 formed so as to lie directly above the retention capacitor line 13. (a) of FIG. 11 is an enlarged plan view illustrating a region and its vicinity, in which region the auxiliary electrode 26 is formed. (b) of FIG. 11 is a cross-sectional view taken along line A-A of (a) of FIG. 11. These figures illustrate a layered structure in which the gate insulating film 24 is formed above the retention capacitor line 13, and the auxiliary electrode 26 is formed above the gate insulating film. The retention capacitor line 13 is electrically connected with the auxiliary electrode 26 via a film formed in a contact hole 27, the film being made of a conductive material such as ITO.

The auxiliary electrode 26 overlaps both of the separated region and the portion of the retention capacitor line 13, the portion being designed to be separate from the separated region. The contact hole 27 is provided so as to lie directly above the portion of the retention capacitor line 13, the portion being designed to be separate from the separated region.

The repairing process changes the state illustrated in (a) of FIG. 10 into a state illustrated in (b) of FIG. 10. Specifically, the wire 17B is cut at a position indicated by CP2; the retention capacitor line 13 is cut at positions indicated by CP1; and the cutout region is short-circuited with the wires 17A and 17B at two positions indicated by MP1, by which the cutout region overlaps the wires 17A and 17B.

In the state after the repairing process, the retention capacitance is maintained not only in a region by which the wire 17A overlaps the retention capacitor line 13, the region being separate from the cutout region, but also in a region by which the cutout region overlaps the auxiliary electrode 26. Specifically, the cutout region has a potential applied from the wire 17A, whereas the auxiliary electrode 26 has a potential of the retention capacitor line 13. This causes the cutout region and the auxiliary electrode to form a retention capacitance between them.

According to the above arrangement, although the repairing process reduces the retention capacitance formed by the wires 17A and 17B, the auxiliary electrode 26 forms a new retention capacitance. This reduces the amount of change in the retention capacitance due to the repairing process.

(Variation of Example Arrangement of Slit)

The following description deals with a variation of the slits SL formed in each retention capacitor line 13. The above examples each include a single slit SL at each target location, the slit having its longitudinal direction parallel to the direction in which the retention capacitor line 13 extends. In contrast, the retention capacitor line 13 may include two slits SL at each target location, as illustrated in (a) of FIG. 12.

In this case, each of the two slits SL is formed so as to have its longitudinal direction parallel to the direction in which the retention capacitor line 13 extends. Further, each of the two slits SL is formed so as to lie at a position along a direction perpendicular to the longitudinal direction of the other slit. A region defined by the two slits SL is designated as a cutout region.

Figure 12:
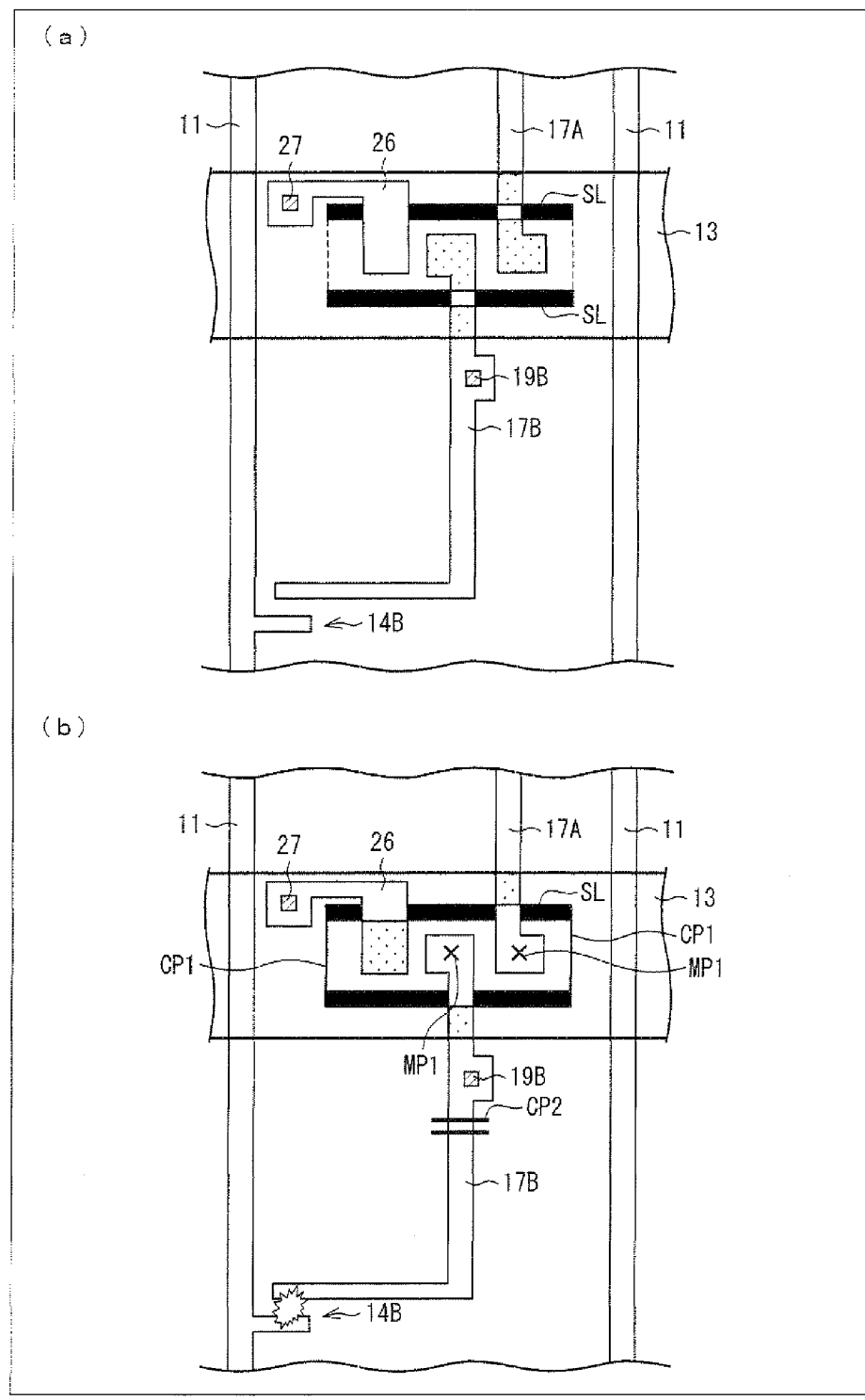

In the example illustrated in (a) of FIG. 12, the cutout region defined by the two slits SL includes respective ends of the wires 17A and 17B and of the auxiliary electrode 26. In this state, when a source-drain short-circuiting defect has occurred to the TFT 14B, the repairing process described below is carried out, thus resulting in a state illustrated in (b) of FIG. 12. The wire 17B is cut at a position indicated by CP2; the retention capacitor line 13 is cut at positions indicated by CP1; and the cutout region is short-circuited with the wires 17A and 17B at two positions indicated by MP1, by which the cutout region overlaps the wires 17A and 17B.

As described above, the cutout region may be formed of a region defined by a single slit SL and the side surface of the retention capacitor line, or by the two slits SL. These two arrangements result in an equivalent display performance after the repairing process.

(Combination of First and Second Example Arrangements)

The following description deals with an example arrangement combining the above first and second example arrangements. The first example arrangement includes two sub pixel regions within each single pixel, the two sub pixel regions having display states differing from each other. The second example arrangement includes two partial pixel regions within each single pixel, the two partial pixel regions having an identical display state. These example arrangements may be combined in the following manner: Each single pixel includes three partial pixel regions. Of these, two partial pixel regions have an identical display state and thus form a first sub pixel region, whereas the remaining partial pixel region (second sub pixel region) has a display state differing from the display state of the above two partial pixel regions. (a) of FIG. 13 illustrates an arrangement to achieve this.

Figure 13:
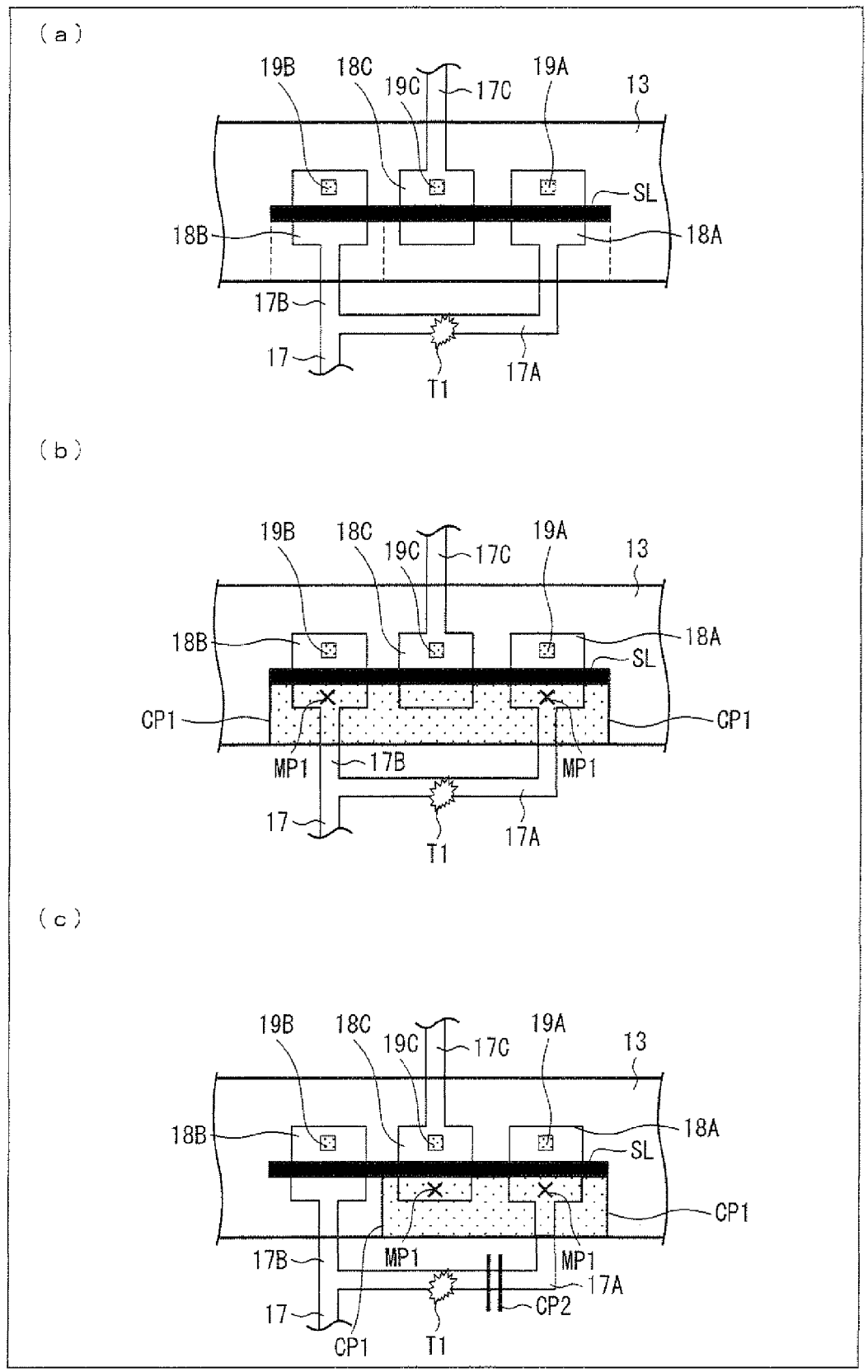

(a) of FIG. 13 is a plan view illustrating a state of a region of a retention capacitor line 13 and its vicinity, in which region retention capacitor upper electrodes 18A, 18B, and 18C are formed. As illustrated in (a) of FIG. 13, the retention capacitor line 13 includes a slit SL having its longitudinal direction parallel to a direction in which the retention capacitor line 13 extends. The slit SL is formed so as to overlap, when viewed in the direction perpendicular to the substrate, respective regions in which the retention capacitor upper electrodes 18A, 18B, and 18C are formed.

Before reaching the retention capacitor line, the wire 17 branches into two: wires 17A and 17B, which are connected with the retention capacitor upper electrodes 18A and 18B, respectively, provided directly above the retention capacitor line 13. The retention capacitor upper electrodes 18A and 18B and the retention capacitor line 13 form a retention capacitance for the first sub pixel region between them.

The retention capacitor upper electrodes 18A and 18B have contact holes 19A and 19B, respectively. The retention capacitor upper electrode 18A is electrically connected, via the contact hole 19A, with one pixel electrode for forming the first sub pixel region. The retention capacitor upper electrode 18B is electrically connected, via the contact hole 19B, with the other pixel electrode for also forming the first sub pixel region.

Further, a wire 17C is connected with the retention capacitor upper electrode 18C provided directly above the retention capacitor line 13. The retention capacitor upper electrode 18C and the retention capacitor line 13 form a retention capacitance for the second sub pixel region between them.

The retention capacitor upper electrode 18C has a contact hole 19C, through which the retention capacitor upper electrode 18C is electrically connected with a pixel electrode for forming the second sub pixel region.

Note that the pixel electrode with which the retention capacitor upper electrode 18A is connected is electrically separate from the pixel electrode with which the retention capacitor upper electrode 18B is connected, as in the third example arrangement.

It is assumed with regard to the above arrangement that the wire 17A has been broken due, e.g., to a foreign object and/or a defective film formation. Such breakage prevents application of a voltage to the pixel electrode electrically connected with the wire 17A. This causes the corresponding pixel to appear as a defective pixel in a liquid crystal display device. The following description deals with how such a defect can be repaired.

A repairing process includes two steps described below. The two steps are carried out in an order that is not particularly limited. Thus, they may be carried out in any order.

The first step is to electrically separate a region of the retention capacitor line 13 from the rest of it, the region being defined by the slit SL and a side surface of the retention capacitor line 13 with respect to its extending direction. In the example illustrated in (b) of FIG. 13, the retention capacitor line is cut in two regions indicated by CP1, the regions being located between (i) ends of the slit SL with respect to its longitudinal direction and (ii) the side surface of the retention capacitor line 13. This allows a partial region of the retention capacitor line 13 to form a separated region electrically separated from the rest of the retention capacitor line 13. The cutting of the retention capacitor line 13 is carried out so that the separated region formed by the cutting of the retention capacitor line 13 overlaps all the respective regions in which the retention capacitor upper electrodes 18A, 18B, and 18C are formed. The cutting of the retention capacitor line 13 is carried out by laser beam irradiation as in the above.

The second step is to cause a short circuit between (i) the separated region formed earlier or later during the first step and (ii) each of the retention capacitor upper electrodes 18A and 18B at a portion located directly above the separated region. In the example illustrated in (b) of FIG. 13, the short-circuiting is carried out in a region MP1, by which the retention capacitor upper electrode 18A overlaps the separated region, and in another region MP1, by which the retention capacitor upper electrode 18B overlaps the separated region. The above short-circuiting of the electrodes is carried out by laser beam irradiation from a front side of the active matrix substrate 1.

Through the above repairing process, the first step allows for the formation of the separated region, while the second step electrically connects the retention capacitor upper electrodes 18A and 18B with each other via the separated region. This causes a voltage to be applied from the wire 17B via the separated region to the retention capacitor upper electrode 18A. This in turn allows for achievement of a display state substantially equivalent to a normal display state.

(c) of FIG. 13 illustrates an alternative repairing process. This repairing process includes two steps described below. The two steps are carried out in an order that is not particularly limited. Thus, they may be carried out in any order.

The first step is to form a separated region in a manner similar to the above. However, the retention capacitor line 13 is cut so that the separated region formed by the cutting of the retention capacitor line 13 overlaps only the retention capacitor upper electrodes 18A and 18C, and thus does not overlap the retention capacitor upper electrode 18B. The cutting of the retention capacitor line 13 is carried out by laser beam irradiation as in the above.

The second step is to cause a short circuit between (i) the separated region formed earlier or later during the first step and (ii) each of the retention capacitor upper electrodes 18A and 18C at a portion located directly above the separated region. In the example illustrated in (c) of FIG. 13, the short-circuiting is carried out in a region MP1, by which the retention capacitor upper electrode 18A overlaps the separated region, and in another region MP1, by which the retention capacitor upper electrode 18C overlaps the separated region. The above short-circuiting of the electrodes is carried out by laser beam irradiation from the front side of the active matrix substrate 1.

Through the above repairing process, the first step allows for the formation of the separated region, while the second step electrically connects the retention capacitor upper electrodes 18A and 18C with each other via the separated region. This causes a voltage to be applied from the wire 17C via the separated region to the retention capacitor upper electrode 18A.

In the normal state described above, an identical signal potential is supplied to both the first and second sub pixel regions, while a gate ON signal is supplied during different periods. This causes their respective display states to differ from each other. In contrast, after the above repairing process, an identical signal potential is supplied to both the first and second sub pixel regions, while a gate ON signal is supplied during the same period. This causes their respective display states to be completely identical to each other. In other words, the repairing process prevents the formation of the two regions within a single pixel, the regions differing from each other in how a voltage is applied. However, the repairing process causes the repaired second sub pixel region to also carry out a display corresponding to image data to be displayed by the target pixel. As a result, it is possible to repair pixel defects to the extent that the defects can hardly be viewed as such.

(Arrangement of Television Receiver)

The following description deals with an example use of the liquid crystal display device of the present invention in a television receiver. FIG. 14 is a block diagram illustrating an arrangement of a display device 800 for use in the television receiver. The display device 800 includes a Y/C separation circuit 80, a video-chroma circuit 81, an A/D converter 82, a liquid crystal controller 83, a liquid crystal panel 84, a backlight driving circuit 85, a backlight 86, a microcomputer 78, and a gradation circuit 88. The liquid crystal panel 84 is compatible with the liquid crystal display device of the present invention. The liquid crystal panel includes: a display section including an active matrix pixel array; and a source driver and a gate driver for driving the display section.

In the display device 800 having the above arrangement, a composite color visual signal Scv as a television signal is first externally supplied into the Y/C separation circuit 80, and is separated into a luminance signal and a color signal therein. The luminance signal and the color signal are converted, by the video-chromes circuit 81, into analog RGB signals corresponding to the three primary colors of light. The analog RGB signals are converted into digital RGB signals by the A/D converter 82. The digital RGB signals are supplied into the liquid crystal controller 83. Further, in the Y/C separation circuit 80, horizontal and vertical synchronizing signals are also obtained from the externally supplied composite color visual signal Scv. The synchronizing signals are also supplied via the microcomputer 78 into the liquid crystal controller 83.

The liquid crystal controller 83 supplies a data signal for use in a driver, in accordance with the digital RGB signals (corresponding to the above digital video signal Dv) supplied from the A/D converter 82. The liquid crystal controller 83 also generates timing control signals in accordance with the synchronizing signals, the timing control signals being used to operate the source driver and the gate driver in the liquid crystal panel 84 so as to achieve the above embodiments. The liquid crystal controller supplies the timing control signals to the source driver and the gate driver. The gradation circuit 88 generates gradation voltages corresponding to the three primary colors R, G, and B, respectively, for color display, the gradation voltages being also supplied to the liquid crystal panel 84.

In the liquid crystal panel 84, the source driver, the gate driver and the like generate drive signals (e.g., a data signal, a scanning signal) in accordance with the data signal for use in a driver, the timing control signals, and the gradation voltages. The display section provided inside the liquid crystal panel displays a color image in accordance with those drive signals. Displaying an image by use of the liquid crystal panel 84 requires irradiation of the liquid crystal panel 84 with light from behind the liquid crystal panel. The display device 800 causes the backlight driving circuit 85 to drive the backlight 86 under the control of the microcomputer 78, thus irradiating the liquid crystal panel 84 with light from behind the liquid crystal panel.

The microcomputer 78 controls the entire system, including the above processing. The above externally supplied video signal (composite color visual signal) may not only be a video signal for television broadcast, but also, e.g., a video signal for an image captured by a camera or a video signal supplied via the Internet. The display device 800 is capable of displaying images in accordance with various video signals.

When the display device 800 having the above arrangement displays an image for television broadcast, the display device 800 is connected with a tuner section 90 as illustrated in FIG. 15. The tuner section 90 obtains a signal falling within a reception channel, from among signals (high frequency signals) received via an antenna (not shown). The tuner section converts the signal into an intermediate frequency signal and then detects the intermediate frequency signal so as to obtain a composite color visual signal Scv as a television signal. The composite color visual signal Scv is, as described above, supplied to the display device 800, which in turn displays an image in accordance with the composite color visual signal Scv.

FIG. 16 is an exploded perspective view illustrating an example mechanical arrangement of a television receiver including the display device having the above arrangement. In the example illustrated in FIG. 16, the television receiver includes, as its constituent elements, a first housing 801 and a second housing 806 in addition to the display device 800. The display device 800 is sandwiched by the first housing 801 and the second housing 806 so as to be entirely covered by them. The first housing 801 has an opening 801*a* for transmitting an image displayed by the display device 800. The second housing 806 covers a rear side of the display device 800. The second housing is provided with an operation circuit 805 for operating the display device 800. The second housing is also provided with a support member 808 attached to its lower portion.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The liquid crystal display device of the present invention is applicable to various display devices such as a monitor of a personal computer and a television receiver.

REFERENCE SIGNS LIST 1 active matrix substrate
11 data signal line
12, 12A, 12B scanning signal line
13 retention capacitor line
14, 14A, 14B TFT
15A, 15B gate electrode
16, 16A, 16B drain electrode
17, 17A, 17B, 17C wire
18A, 18B, 18C retention capacitor upper electrode
19A, 19B, 19C contact hole
21, 21A, 21B source electrode
22 semiconductor layer
23 interlayer insulating film
24 gate insulating film
25 substrate
26 auxiliary electrode
27 contact hole
31 pixel electrode
31A, 31B sub pixel electrode
35A, 35B contact hole
80 Y/C separation circuit
81 video-chroma circuit
82 A/D converter
83 liquid crystal controller
84 liquid crystal panel
85 backlight driving circuit
86 backlight
78 microcomputer
88 gradation circuit
90 tuner section
800 display device
801 first housing
801*a* opening
805 operation circuit
806 second housing
808 support member

The invention claimed is:

1. An active matrix substrate comprising:
a substrate on which a transistor element, a pixel electrode, a scanning signal line, a data signal line, and a retention capacitor line are provided,
the active matrix substrate further comprising at least two retention capacitor electrodes each facing the retention capacitor line via an insulating film so as to form a retention capacitance; and connection lines via which the at least two retention capacitor electrodes are connected with the pixel electrode,
the retention capacitor line having at least one opening which penetrates the retention capacitor line in a direction perpendicular to a surface of the substrate,
the at least two retention capacitor electrodes being provided for the retention capacitor line, the at least one opening being formed so as to include first regions facing respective second regions in which the at least two retention capacitor electrodes are provided,
wherein the at least one opening is formed so as to include the first regions, the number of the at least one opening being one, and
wherein the at least one opening is formed closer to a first side surface of the retention capacitor line than to a second side surface of the retention capacitor line, the first and second side surfaces being perpendicular to the direction in which the retention capacitor line is provided; and each of the at least two retention capacitor electrodes is formed, in a position where a corresponding one of the respective second regions is included, so that a region which extends from the corresponding one of the respective second regions to the first side surface is larger in area than a region which extends from the corresponding one of the respective second regions to the second side surface.

2. The active matrix substrate according to claim 1, wherein the at least one opening has a shape of a linear slit when it is viewed in a direction perpendicular to the substrate, and a longitudinal direction in which the at least one opening extends is parallel to a direction in which the retention capacitor line extends.

3. The active matrix substrate according to claim 1, further comprising an auxiliary electrode provided, in a position which includes the second regions, (i) so as to face the retention capacitor line via an insulating film and (ii) so as to be electrically connected with the retention capacitor line.

4. The active matrix substrate according to claim 1, wherein a pixel includes a plurality of pixel electrodes.

5. The active matrix substrate according to claim 4, wherein the at least two retention capacitor electrodes, that are provided in a region which faces the at least one opening, are connected with respective pixel electrodes which constitute an identical pixel.

6. The active matrix substrate according to claim 4, wherein the at least two retention capacitor electrodes, that are provided in a region which faces the at least one opening, are connected with respective pixel electrodes which constitute pixels adjacent to each other.

7. A liquid crystal panel comprising:
an active matrix substrate, the active matrix substrate including a substrate on which a transistor element, a pixel electrode, a scanning signal line, a data signal line, and a retention capacitor line are provided,
the active matrix substrate further including at least two retention capacitor electrodes each facing the retention capacitor line via an insulating film so as to form a retention capacitance; and connection lines via which the at least two retention capacitor electrodes are connected with the pixel electrode,
the retention capacitor line having at least one opening which penetrates the retention capacitor line in a direction perpendicular to a surface of the substrate, the at least two retention capacitor electrodes being provided for the retention capacitor line, the at least one opening being formed so as to include first regions facing respective second regions in which the at least two retention capacitor electrodes are provided, wherein the at least one opening is formed so as to include the first regions, the number of the at least one opening being one, and wherein the at least one opening is formed closer to a first side surface of the retention capacitor line than to a second side surface of the retention capacitor line, the first and second side surfaces being perpendicular to the direction in which the retention capacitor line is provided; and each of the at least two retention capacitor electrodes is formed, in a position where a corresponding one of the respective second regions is included, so that a region which extends from the corresponding one of the respective second regions to the first side surface is larger in area than a region which extends from the corresponding one of the respective second regions to the second side surface.

8. A liquid crystal display unit comprising:
a liquid crystal panel; and
a driver for the liquid crystal panel,
the liquid crystal panel including an active matrix substrate, the active matrix substrate including a substrate on which a transistor element, a pixel electrode, a scanning signal line, a data signal line, and a retention capacitor line are provided,
the active matrix substrate further including: at least two retention capacitor electrodes each facing the retention capacitor line via an insulating film so as to form a retention capacitance; and connection lines via which the at least two retention capacitor electrodes are connected with the pixel electrode, the retention capacitor line having at least one opening which penetrates the retention capacitor line in a direction perpendicular to a surface of the substrate, the at least two retention capacitor electrodes being provided for the retention capacitor line, the at least one opening being formed so as to include first regions facing respective second regions in which the at least two retention capacitor electrodes are provided, wherein the at least one opening is formed so as to include the first regions, the number of the at least one opening being one, and wherein the at least one opening is formed closer to a first side surface of the retention capacitor line than to a second side surface of the retention capacitor line, the first and second side surfaces being perpendicular to the direction in which the retention capacitor line is provided; and each of the at least two retention capacitor electrodes is formed, in a position where a corresponding one of the respective second regions is included, so that a region which extends from the corresponding one of the respective second regions to the first side surface is larger in area than a region which extends from the corresponding one of the respective second regions to the second side surface.

9. A liquid crystal display device comprising:
a liquid crystal display unit; and
an illumination device,
the liquid crystal display unit including: a liquid crystal panel; and a driver for the liquid crystal panel,
the liquid crystal panel including an active matrix substrate,
the active matrix substrate including a substrate on which a transistor element, a pixel electrode, a scanning signal line, a data signal line, and a retention capacitor line are provided,
the active matrix substrate further including: at least two retention capacitor electrodes each facing the retention capacitor line via an insulating film so as to form a retention capacitance; and connection lines via which the at least two retention capacitor electrodes are connected with the pixel electrode, the retention capacitor line having at least one opening which penetrates the retention capacitor line in a direction perpendicular to a surface of the substrate, the at least two retention capacitor electrodes being provided for the retention capacitor line, the at least one opening being formed so as to include first regions facing respective second regions in which the at least two retention capacitor electrodes are provided, wherein the at least one opening is formed so as to include the first regions, the number of the at least one opening being one, and wherein the at least one opening is formed closer to a first side surface of the retention capacitor line than to a second side surface of the retention capacitor line, the first and second side surfaces being perpendicular to the direction in which the retention capacitor line is provided; and each of the at least two retention capacitor electrodes is formed, in a position where a corresponding one of the respective second regions is included, so that a region which extends from the corresponding one of the respective second regions to the first side surface is larger in area than a region which extends from the corresponding one of the respective second regions to the second side surface.

10. A television receiver comprising:
a liquid crystal display device; and
a tuner section for receiving a television broadcast,
the liquid crystal display device including: a liquid crystal display unit; and an illumination device,
the liquid crystal display unit including: a liquid crystal panel; and a driver for the liquid crystal panel,
the liquid crystal panel including an active matrix substrate, the active matrix substrate including a substrate on which a transistor element, a pixel electrode, a scanning signal line, a data signal line, and a retention capacitor line are provided,
the active matrix substrate further including: at least two retention capacitor electrodes each facing the retention capacitor line via an insulating film so as to form a retention capacitance; and connection lines via which the at least two retention capacitor electrodes are connected with the pixel electrode, the retention capacitor line having at least one opening which penetrates the retention capacitor line in a direction perpendicular to a surface of the substrate, the at least two retention capacitor electrodes being provided for the retention capacitor line, the at least one opening being formed so as to include first regions facing respective second regions in which the at least two retention capacitor electrodes are provided, wherein the at least one opening is formed so as to include the first regions, the number of the at least one opening being one, and wherein the at least one opening is formed closer to a first side surface of the retention capacitor line than to a second side surface of the retention capacitor line, the first and second side surfaces being perpendicular to the direction in which the retention capacitor line is provided; and each of the at least two retention capacitor electrodes is formed, in a position where a corresponding one of the respective second regions is included, so that a region which extends from the corresponding one of the respective second regions to the first side surface is larger in area than a region which extends from the corresponding one of the respective second regions to the second side surface.

11. A method for manufacturing an active matrix substrate, the active matrix substrate including a substrate on which a transistor element, a pixel electrode, a scanning signal line, a data signal line, and a retention capacitor line are provided, the active matrix substrate further including: at least two retention capacitor electrodes each facing the retention capacitor line via an insulating film so as to form a retention capacitance; and connection lines via which the at least two retention capacitor electrodes are connected with the pixel electrode, the retention capacitor line having at least one opening which penetrates the retention capacitor line in a direction perpendicular to a surface of the substrate, the at least two retention capacitor electrodes being provided for the retention capacitor line, the at least one opening being formed so as to include first regions facing respective second regions in which the at least two retention capacitor electrodes are provided, the method comprising the steps of:

cutting off a region of the retention capacitor line, the region being defined either by (i) the at least one opening and (ii) a side surface of the retention capacitor line with respect to its extending direction or by a plurality of the at least one opening, so as to electrically separate the region from a rest of the retention capacitor line, whereby a separated region is formed; and short-circuiting the separated region with each of the at least two of the retention capacitor electrodes at a portion lying directly above the separated region.

12. The method for manufacturing an active matrix substrate according to claim 11, further comprising the step of: cutting a connection line which electrically connects the pixel electrode with the transistor element, when the pixel electrode has a defect which causes no voltage to be normally applied to the pixel electrode.

* * * * *